(12) United States Patent
Hao et al.

(10) Patent No.: US 12,015,965 B2
(45) Date of Patent: Jun. 18, 2024

(54) APPARATUS AND USER EQUIPMENT POSITIONING METHOD

(71) Applicant: HUAWEI TECHNOLOGIES CO., LTD., Guangdong (CN)

(72) Inventors: Jinping Hao, Shanghai (CN); Su Huang, Shanghai (CN); Lei Chen, Chengdu (CN); Shuigen Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 331 days.

(21) Appl. No.: 17/475,618

(22) Filed: Sep. 15, 2021

(65) Prior Publication Data

US 2022/0007148 A1 Jan. 6, 2022

Related U.S. Application Data

(63) Continuation of application No. PCT/CN2020/078962, filed on Mar. 12, 2020.

(30) Foreign Application Priority Data

Mar. 15, 2019 (CN) .......................... 201910199679.4

(51) Int. Cl.
*H04W 4/029* (2018.01)
*G01S 5/02* (2010.01)

(52) U.S. Cl.
CPC ......... *H04W 4/029* (2018.02); *G01S 5/02521* (2020.05)

(58) Field of Classification Search
None
See application file for complete search history.

(56) References Cited

U.S. PATENT DOCUMENTS

2017/0142680 A1* 5/2017 Malkin ................. H04W 64/00
2017/0374637 A1* 12/2017 Akkarakaran ...... H04W 64/006
2019/0037338 A1* 1/2019 Edge ...................... H04W 4/02

FOREIGN PATENT DOCUMENTS

| CN | 104683949 A | 6/2015 |
| CN | 108064056 A | 5/2018 |
| CN | 108271236 A | 7/2018 |
| WO | 2019027595 A1 | 2/2019 |

OTHER PUBLICATIONS

1 Extended European Search Report issued in European Application No. 20772722.3 dated Mar. 23, 2022, 11 pages.
(Continued)

*Primary Examiner* — Adolf Dsouza
(74) *Attorney, Agent, or Firm* — Fish & Richardson P.C.

(57) ABSTRACT

In an example positioning method, a first network device receives first measurement information of at least one first access network device and first assistance information, where the first measurement information is obtained by a terminal device by measuring a signal sent from the at least one first access network device. The first network device determines position information of the terminal device based on the first assistance information and the first measurement information.

20 Claims, 10 Drawing Sheets

(56) References Cited

OTHER PUBLICATIONS

Huawei, HiSilicon "Considerations on Angle-based positioning technique in NR," 3GPP TSG-RAN WG2 Meeting #105, R2-1901283, Athens, Greece, Feb. 25-Mar. 1, 2019, 4 pages.
Huawei, "Remaining issues on DL based positioning," 3GPP TSG RAN WG1 Meeting #96, R1-1901574, Athens, Greece, Feb. 25-Mar. 1, 2019, 8 pages.
3GPP TS 38.305 V15.2.0 (Dec. 2018), "3rd Generation Partnership Project; Technical Specification Group Radio Access Network; NG Radio Access Network (NG-RAN); Stage 2 functional specification of User Equipment (UE) positioning in NG-RAN(Release 15)," Dec. 2018, 69 pages.
LG Electronics, "Discussions on DL only based Positioning," 3GPP TSG RAN WG1 #96, R1-1903346, Athens, Greece, Feb. 25-Mar. 1, 2019, 15 pages.
Qualcomm Incorporated, "RAT-dependent DL-only NR positioning techniques," 3GPP TSG RAN WG1 #96, R1-1903018, Athens, Greece, Feb. 25-Mar. 1, 2019, 11 pages.
3GPP TS 38.455 V15.2.1 (Jan. 2019), "3rd Generation Partnership Project; Technical Specification Group Radio Access Network; NG-RAN; NR Positioning Protocol A (NRPPa) (Release 15)," Jan. 2019, 60 pages.
Office Action issued in Chinese Application No. 201910199679.4 dated Feb. 1, 2021, 16 pages (with English translation).
PCT International Search Report and Written Opinion issued in International Application No. PCT/CN2020/078962 dated Jun. 11, 2020, 12 pages (with English translation).
1 Office Action in Japanese Appln. No. 2021-555303, dated Oct. 18, 2022, 10 pages (with English translation).

\* cited by examiner

APPARATUS AND USER EQUIPMENT POSITIONING METHOD

CROSS-REFERENCE TO RELATED APPLICATIONS

This application is a continuation of International Application No. PCT/CN2020/078962, filed on Mar. 12, 2020, which claims priority to Chinese Patent Application No. 201910199679.4, filed on Mar. 15, 2019. The disclosures of the aforementioned applications are hereby incorporated by reference in their entireties.

TECHNICAL FIELD

This application relates to data transmission, and specifically, to an apparatus and a user equipment positioning method.

BACKGROUND

In a conventional downlink positioning method, user equipment (UE) obtains, through measurement, measurement information such as a time difference of arrival (TDOA) between a time point at which downlink signals of a plurality of cell base stations arrive at the UE and a time point at which a downlink signal of a reference base station arrives at the UE, and sends the measurement information to a location management function (LMF) apparatus. The LMF apparatus may determine a position of the UE based on the measurement information.

With application of a large-scale antenna, positioning performed by using an angle of departure (AoD) or a distance of the UE relative to an access network device is a possible positioning manner. The measurement information may be obtained by the UE by measuring the downlink signals of the plurality of base stations. There is no effective solution to how intermediate information, m, the AoD or the distance of the UE relative to the access network device, used for positioning of the UE is determined based on the measurement information to implement positioning of the UE.

SUMMARY

An objective of the present invention is to provide a user equipment UE positioning method. According to the method, measurement information of UE is received, and a network device may determine, based on assistance information of an access network device, intermediate information used for positioning of the UE, so that positioning of the UE can be implemented.

According to a first aspect, a user equipment UE positioning method is provided. The method includes: A first access network device receives first measurement information, where the first measurement information is obtained by user equipment UE by measuring a signal sent by the first access network device. The first access network device determines first intermediate information based on the first measurement information and first assistance information that is of the first access network device, where the first intermediate information is used to determine position information of the UE. The first access network device sends the first intermediate information to a first network device.

In the foregoing technical solution, when an LMF apparatus cannot perform positioning based on measurement information of the UE, how to exchange information to obtain intermediate information used for positioning of the UE is resolved, so that positioning of the UE can be implemented. The first access network device determines, based on the first measurement information obtained by the UE by measuring the signal sent by the first access network device and the first assistance information that is of the first access network device, the first intermediate information used for positioning of the UE, so that positioning of the UE can be implemented.

With reference to the first aspect, in a possible implementation, the first access network device is a serving access network device of the UE. That a first access network device receives first measurement information includes: The first access network device receives the first measurement information sent by the UE or a core network apparatus.

With reference to the first aspect, in a possible implementation, the method further includes: The first access network device receives at least one piece of second measurement information. An $i^{th}$ piece of second measurement information in the at least one piece of second measurement information is obtained by the UE by measuring a signal sent by an $i^{th}$ second access network device, and i is a positive integer greater than or equal to 1. The first access network device sends the $i^{th}$ piece of second measurement information to the $i^{th}$ second access network device. The first measurement information and the at least one piece of second measurement information are carried in a same message or different messages.

Measurement information of the UE is exchanged between the serving access network device of the UE and a non-serving access network device of the UE, so that the non-serving access network device of the UE can receive measurement information corresponding to the access network device, to determine intermediate information corresponding to the access network device, so that positioning of the UE can be implemented.

With reference to the first aspect, in a possible implementation, the first access network device is an access network device other than a serving access network device of the UE. That a first access network device receives first measurement information includes: The first access network device receives the first measurement information sent by the serving access network device of the UE or a core network apparatus.

Measurement information of the UE is exchanged between the serving access network device of the UE and a non-serving access network device of the UE, or measurement information of the UE is exchanged between a core network apparatus and an access network device, to ensure that the first access network device, namely, the non-serving access network device of the UE, can receive the first measurement information.

With reference to the first aspect, in a possible implementation, the first network device has a location management function LMF.

With reference to the first aspect, in a possible implementation, the first intermediate information includes an angle of departure AoD and/or a distance from the first access network device to the UE.

With reference to the first aspect, in a possible implementation, the first measurement information includes at least one of the following information: reference signal received power RSRP information corresponding to the first access network device, received signal strength indicator RSSI information corresponding to the first access network device, received signal strength RSS information corresponding to the first access network device, or reference signal received quality RSRQ information corresponding to the first access network device, where the RSRP information includes RSRPs in directions of a plurality of beams of the first access network device and/or information determined based on the RSRPs.

With reference to the first aspect, in a possible implementation, the first assistance information includes at least one of the following information: beam gains of the plurality of beams of the first access network device, a feature of a channel of the plurality of beams of the first access network device, a fingerprint information base of the first access network device, or a transmit power for sending the signal by the first access network device, where the fingerprint information base includes a mapping relationship between at least one group of measurement information and an angle of departure AoD from the first access network device to the UE.

According to a second aspect, a user equipment UE positioning method is provided. The method includes: A first network device receives first assistance information of at least one first access network device. The first network device receives first measurement information sent by user equipment UE, where the first measurement information is obtained by the UE by measuring a signal sent by the at least one first access network device. The first network device determines first intermediate information based on the first assistance information and the first measurement information.

In the foregoing technical solution, when an LMF apparatus cannot perform positioning based on measurement information of the UE, how to exchange information to implement positioning of the UE is resolved. The first network device receives the first assistance information that is of the at least one first access network device and the first measurement information that is obtained by UE by measuring the signal sent by the at least one first access network device, and determines the first intermediate information used for positioning of the UE, so that positioning of the UE can be implemented.

With reference to the second aspect, in a possible implementation, the method further includes: The first network device determines position information of the UE based on the first intermediate information.

With reference to the second aspect, in a possible implementation, the first network device is a second access network device. The method further includes: The first network device receives second measurement information, where the second measurement information is obtained by the UE by measuring a signal sent by the first network device. The first network device determines second intermediate information based on the second measurement information and second assistance information of the first network device. The first measurement information and the second measurement information are carried in same or different information.

With reference to the second aspect, in a possible implementation, the first assistance information is sent by each of the at least one first access network device to the first network device after each of the at least one first access network device receives an identifier of the first network device and/or an identifier of a first cell that are/is sent by a location management function LMF apparatus, where the first cell is a cell in which the UE is located and that is in one or more cells covered by the first network device.

With reference to the second aspect, in a possible implementation, the method further includes: The first network device sends the first intermediate information and the second intermediate information to a second network device, where the second network device has a location management function LMF.

With reference to the second aspect, in a possible implementation, the method further includes: The first network device determines position information of the UE based on the at least one piece of first intermediate information and the second intermediate information.

With reference to the second aspect, in a possible implementation, the method further includes: The first network device sends the position information to an access and mobility management function AMF apparatus or a location management function LMF apparatus.

With reference to the second aspect, in a possible implementation, the first network device is a location management function LMF apparatus.

With reference to the second aspect, in a possible implementation, before a first network device receives first assistance information of at least one first access network device, the method further includes: The first network device sends assistance information request information to an $i^{th}$ first access network device in the at least one first access network device, where the assistance information request information is used to request first assistance information of the $i^{th}$ first access network device, and i is a positive integer greater than or equal to 1.

With reference to the second aspect, in a possible implementation, the first intermediate information includes an angle of departure AoD and/or a distance from the first access network device to the JE.

With reference to the second aspect, in a possible implementation, the first measurement information includes at least one of the following information: reference signal received power RSRP information, received signal strength indicator RSSI information, received signal strength RSS information, or reference signal received quality RSRQ information, where the RSRP information includes RSRPs in directions of a plurality of beams of each of the at least one first access network device and/or information determined based on the RSRPs.

With reference to the second aspect, in a possible implementation, the first assistance information includes at least one of the following information: beam gains of the plurality of beams of the first access network device, a feature of a channel of the plurality of beams of the first access network device, a fingerprint information base of the first access network device, or a transmit power for sending the signal by the first access network device, where the fingerprint information base includes a mapping relationship between at least one group of measurement information and an angle of departure AoD from the first access network device to the UE.

According to a third aspect, an access network device is provided. The access network device includes a transceiver module, configured to receive first measurement information, where the first measurement information is obtained by user equipment UE by measuring a signal sent by the access network device; and a determining module, configured to determine first intermediate information based on the first measurement information and first assistance information that is of the access network device, where the first intermediate information is used to determine position information of the UE. The transceiver module is further configured to send the first intermediate information to a first network device.

With reference to the third aspect, in a possible implementation, the access network device is a serving access network device of the UE. The first receiving module is configured to receive the first measurement information sent by the UE or a core network apparatus.

With reference to the third aspect, in a possible implementation, the transceiver module is further configured to receive at least one piece of second measurement information. An $i^{th}$ piece of second measurement information in the at least one piece of second measurement information is obtained by the UE by measuring a signal sent by an $i^{th}$ second access network device, and i is a positive integer greater than or equal to 1. The transceiver module is further configured to: send the $i^{th}$ piece of second measurement information to the $i^{th}$ second access network device. The first measurement information and the at least one piece of second measurement information are carried in a same message or different messages.

With reference to the third aspect, in a possible implementation, the access network device is an access network device other than a serving access network device of the UE. The transceiver module is further configured to receive the first measurement information sent by the serving access network device of the UE or a core network apparatus.

With reference to the third aspect, in a possible implementation, the first network device has a location management function LMF.

With reference to the third aspect, in a possible implementation, the first intermediate information includes an angle of departure AoD and/or a distance from the access network device to the UE.

With reference to the third aspect, in a possible implementation, the first measurement information includes at least one of the following information: reference signal received power RSRP information corresponding to the access network device, received signal strength indicator RSSI information corresponding to the access network device, received signal strength RSS information corresponding to the access network device, or reference signal received quality RSRQ information corresponding to the access network device, where the RSRP information includes RSRPs in directions of a plurality of beams of the access network device and/or information determined based on the RSRPs.

With reference to the third aspect, in a possible implementation, the first assistance information includes at least one of the following information: beam gains of the plurality of beams of the access network device, a feature of a channel of the plurality of beams of the access network device, a fingerprint information base of the access network device, or a transmit power for sending the signal by the access network device, where the fingerprint information base includes a mapping relationship between at least one group of measurement information and an angle of departure AoD from the access network device to the UE.

According to a fourth aspect, a network device is provided. The network device includes: a transceiver module, configured to receive first assistance information of at least one first access network device, where the transceiver module is further configured to receive first measurement information sent by user equipment UE, and the first measurement information is obtained by the UE by measuring a signal sent by the at least one first access network device; and a determining module, configured to determine first intermediate information based on the first assistance information and the first measurement information.

With reference to the fourth aspect, in a possible implementation, the determining module is further configured to determine position information of the UE based on the first intermediate information.

With reference to the fourth aspect, in a possible implementation, the network device is a second access network device. The transceiver module is further configured to receive second measurement information, where the second measurement information is obtained by the UE by measuring a signal sent by the network device. The determining module is further configured to determine second intermediate information based on the second measurement information and second assistance information of the network device.

With reference to the fourth aspect, in a possible implementation, the first assistance information is sent by each of the at least one first access network device to the network device after each of the at least one first access network device receives an identifier of the network device and/or an identifier of a first cell that are/is sent by a location management function LMF apparatus, where the first cell is a cell in which the UE is located and that is in one or more cells covered by the network device.

With reference to the fourth aspect, in a possible implementation, the transceiver module is further configured to: send the first intermediate information and the second intermediate information to a second network device, where the second network device has a location management function LMF.

With reference to the fourth aspect, in a possible implementation, the determining module is further configured to determine position information of the UE based on the at least one piece of first intermediate information and the second intermediate information.

With reference to the fourth aspect, in a possible implementation, the transceiver module is further configured to send the position information to an access and mobility management function AMF apparatus or a location management function LMF apparatus.

With reference to the fourth aspect, in a possible implementation, the network device is a location management function LMF apparatus.

With reference to the fourth aspect, in a possible implementation, the transceiver module is further configured to: before the network device receives the first assistance information of the at least one first access network device, send assistance information request information to an $i^{th}$ first access network device in the at least one first access network device, where the assistance information request information is used to request first assistance information of the $i^{th}$ first access network device, and i is a positive integer greater than or equal to 1.

With reference to the fourth aspect, in a possible implementation, the first intermediate information includes an angle of departure AoD and/or a distance from the first access network device to the UE.

With reference to the fourth aspect, in a possible implementation, the measurement information includes at least one of the following information: reference signal received power RSRP information, received signal strength indicator RSSI information, received signal strength RSS information, or reference signal received quality RSRQ information, where the RSRP information includes RSRPs in directions of a plurality of beams of each of the at least one access network device and/or information determined based on the RSRPs.

With reference to the fourth aspect, in a possible implementation, the first assistance information includes at least one of the following information: beam gains of the plurality of beams of the first access network device, a feature of a channel of the plurality of beams of the first access network device, a fingerprint information base of the first access network device, or a transmit power for sending the signal by the first access network device, where the fingerprint information base includes a mapping relationship between at least one group of measurement information and the AoD.

According to a fifth aspect, a communications apparatus is provided. The communications apparatus includes at least one processor and a communications interface. The communications interface is used by the communications apparatus to exchange information with another communications apparatus; and when program instructions are executed in the at least one processor, the communications apparatus is enabled to implement a function of the first access network device in the first aspect.

According to a sixth aspect, a communications apparatus is provided. The communications apparatus includes at least one processor and a communications interface. The communications interface is used by the communications apparatus to exchange information with another communications apparatus; and when program instructions are executed in the at least one processor, the communications apparatus is enabled to implement a function of the first network device in the second aspect.

According to a seventh aspect, a computer program storage medium is provided. The computer program storage medium has program instructions. When the program instructions are directly or indirectly executed, a function of the first access network device in the method provided in the first aspect is implemented.

According to an eighth aspect, a computer program storage medium is provided. The computer program storage medium has program instructions; and when the program instructions are directly or indirectly executed, a function of the first network device in the method provided in the second aspect is implemented.

According to a ninth aspect, a chip system is provided. The chip system includes at least one processor; and when program instructions are executed in the at least one processor, a function of the first access network device in the method provided in the first aspect is implemented.

According to a tenth aspect, a chip system is provided. The chip system includes at least one processor; and when program instructions are executed in the at least one processor, a function of the first network device in the method provided in the second aspect is implemented.

DESCRIPTION OF EMBODIMENTS

The following clearly describes technical solutions in embodiments of the present invention with reference to the accompanying drawings in the embodiments of the present invention. It is clear that the described embodiments are merely some but not all of the embodiments of the present invention. All other embodiments obtained by a person of ordinary skill in the art based on the embodiments of the present invention without creative efforts shall fall within the protection scope of this application.

Figure 1:
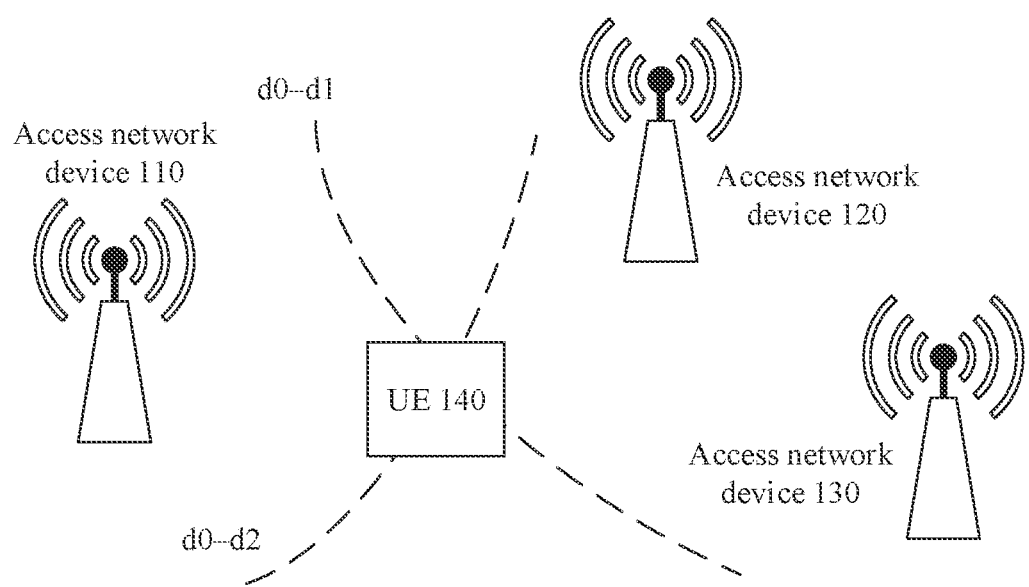
FIG. 1 is a schematic diagram of a scenario of downlink positioning of user equipment.

FIG. 1 is a schematic diagram of a scenario of downlink positioning of user equipment. In a scenario shown in FIG. 1, because distances from different base stations to UE may be the same or different, time points at which signals travel from different base stations to the UE may also be the same or different. A position of UE 140 may be determined based on a time point when signals sent by an access network 110, a base station 120, and a base station 130 arrive at the UE 140.

The access network device may be configured to connect a terminal to a radio access network (RAN). Therefore, the access network device may also be sometimes referred to as an access device or an access network node. It may be understood that, in systems using different radio access technologies, names of devices having base station functions may be different. For ease of description, in this embodiment of this application, apparatuses that provide a wireless communications access function for the terminal are collectively referred to as an access network device. The access network device may be, for example, an evolved NodeB (eNB) in long term evolution (LTE), or may be a next generation node base station (gNB) in a fifth generation (5G) mobile communications system. The access network device may be a macro base station, or may be a micro base station. Alternatively, the access network device may be a roadside device with a wireless access function or a terminal. The gNB may use a centralized unit (CU)-distributed unit (DU) architecture, or the access network device may be a device including a CU and/or a DU. In the embodiments of this application, devices that can implement functions on a base station side in the embodiments of this application are collectively referred to as an access network device.

The user equipment may also be referred to as a terminal. The user equipment may communicate with one or more core networks (CN) by using the access network device. Sometimes, the user equipment may also be referred to as an access terminal, a terminal, a subscriber unit, a subscriber station, a mobile station, a mobile console, a remote station, a remote terminal, a mobile device, a user terminal, a wireless network device, a user agent, or a user apparatus. The user equipment may be a cellular phone, a cordless phone, a session initiation protocol (SIP) phone, a wireless local loop (WLL) station, a personal digital assistant (PDA), a handheld device having a wireless communications function, a computing device, another device connected to a wireless modem, a vehicle-mounted device, a wearable device, a terminal device in the internet of things and the internet of vehicles, any forms of user equipment in a future network, and the like.

Position information of the UE may be sent to a core network apparatus. The core network apparatus may include an access and mobility management function (AMF) entity, a location management function (LMF) entity, and the like. Core network apparatuses configured to implement different functions may be independent devices, or may be integrated into a same device to implement different functions. The core network apparatus is not limited to an independent device, and the core network apparatus is also included in another device. For example, the access network device may alternatively be a device having one or more core network functions. For example, the access network device may have a location management function. In this embodiment of this application, an apparatus having one or more core network functions may be referred to as a core network, a core network device, a core network apparatus, or a core network element. A device having a location management function may be referred to as an LMF apparatus, and the LMF apparatus may be referred to as a core network apparatus.

In this embodiment of this application, both the access network device and the core network apparatus may be referred to as network devices. In other words, the network device may be an access network device, or may be a core network apparatus.

An observed time difference of arrival (OTDOA) positioning method is a method that can be widely applied and has a relatively good positioning effect, and is also referred to as hyperbola positioning. The UE is located on a hyperbola that uses two access network devices as a focus. As a conventional positioning technology, in an OTDOA technology, every two access network devices are used to determine one hyperbola positioning area. A distance difference between the UE and the access network device 110 and the access network device 120 is d0-d1 to form a hyperbola, and a distance difference between the UE and the access network device 110 and the access network device 130 is d0-d2 to form another hyperbola. Each curve is used as a hyperbola positioning area. A position of the UE may be obtained by determining an intersection point by using the two hyperbolas, and applying an additional condition, for example, geographical position information of an access network device. The OTDOA positioning method requires that more than three access network devices participate in measurement of positioning parameters.

Figure 2:
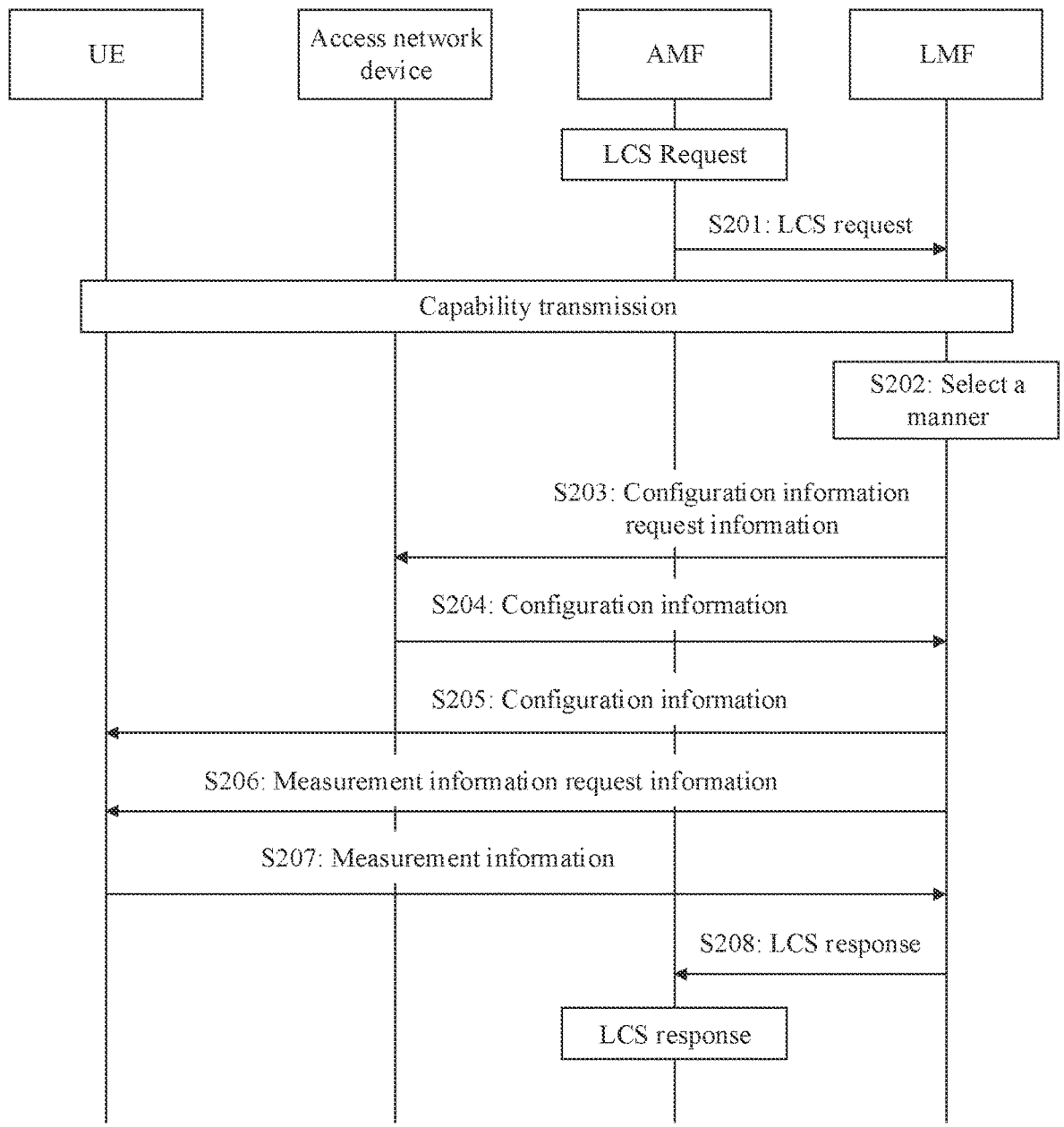
FIG. 2 is a schematic flowchart of a conventional downlink positioning method.

FIG. 2 is a schematic flowchart of a conventional downlink positioning method. UE measures time points at which downlink signals of a plurality of access network devices arrive at the UE, or a time difference of arrival (TDOA) at which the downlink signals arrive at the UE, to determine a position of the UE. The TDOA is a difference of time periods taken by downlink signals of two different access network devices to arrive at the same UE. A conventional downlink positioning technology mainly includes step S201 to step S208. An AMF initiates a UE positioning request.

In step S201, an AMF apparatus sends a location service (LCS) request to an LMF apparatus.

The AMF apparatus may send the LCS request after determining that positioning of the UE needs to be initiated.

In step S202, the LMF apparatus selects a positioning manner.

Optionally, before step S202, the LMF apparatus may perform positioning capability transmission with the UE and/or an access network device. A usable positioning technology may be determined through positioning capability transmission.

The LMF apparatus may select one of a plurality of usable positioning technologies as a UE positioning method.

In step S203, the LMF apparatus sends configuration information request information to access network devices near the UE, to request configuration information of a plurality of access network devices near the UE.

The configuration information may include a configuration of a downlink positioning reference signal. The LMF apparatus sends the configuration information request information to one or more access network devices near the UE.

In step S204, the access network device sends the configuration information to the LMF apparatus.

The configuration information of the plurality of access network devices may be sent by one access network device to the LMF apparatus, or may be sent by the plurality of access network devices to the LMF apparatus.

In step S205, the LMF apparatus sends the configuration information to the UE.

The UE may obtain the configuration information of the plurality of access network devices, for example, configurations of signals of the plurality of access network devices, to measure the signals of the plurality of access network devices. The signal may be, for example, a downlink positioning reference signal.

In step S206, the LMF initiates a positioning information measurement request to the UE.

In step S207, the UE sends measurement information to a positioning center, where the measurement information may be obtained by the UE by measuring the time difference of arrival of the downlink signals of the plurality of access network devices.

In step S208, the LMF apparatus sends an LCS response to the AMF apparatus. The LCS response may include position information, of the UE, determined by the LMF apparatus based on the measurement information.

In the foregoing conventional downlink positioning process, after measuring the arrival time points or the time difference of arrival of the downlink signals, the UE reports the measurement information to the LMF apparatus, and the LMF apparatus determines the position of the UE based on the measurement information reported by the UE.

In some positioning technologies, the LMF apparatus receives only the measurement information of the UE, and cannot determine the position of the UE, and the conventional downlink positioning process is no longer applicable to the positioning technologies. In the positioning technologies, the position of the UE needs to be determined based on intermediate information such as an angle of departure (AoD) or a distance of the UE relative to an access network device. However, there is no complete solution in how to determine the intermediate information used for positioning of the UE.

For example, the UE measures the signals of the plurality of access network devices. The signals may be reference signals, for example, positioning reference signals (PRS). The UE measures the signals to obtain the measurement information. The measurement information may be powers of the received signals, for example, may be reference signal received power (RSRP) information. The RSRP information may include RSRPs of a plurality of beams of the access network device, or may include information obtained after an operation or processing is performed on the RSRPs of the plurality of beams of the access network device. The operation or processing is performed on the RSRPs of the plurality of beams of the access network device, for example, reducing numerical precision of the RSRPs to obtain low-precision RSRPs, obtaining a ratio of the RSRPs of the plurality of beams, performing quantization processing to obtain a ratio of the RSRPs of the plurality of beams relative to one of the RSRPs, or another operation or processing manner, so that a data amount of the measurement information can be reduced, and transmission efficiency can be improved.

The intermediate information may be determined based on the measurement information and assistance information of the access network device. The intermediate information may be an angle of departure (AoD) or a distance of the UE relative to the access network device, for example, may be a downlink angle of departure (department angle of departure, DAoD). The position of the UE may be determined based on intermediate information corresponding to the plurality of access network devices. The assistance information of the access network device may include at least one of the following information: configuration information of the plurality of beams of the access network device, beam gains of the plurality of beams of the access network device, a feature of a channel between the access network device and the UE, a fingerprint information base of the access network device, or a transmit power for sending the signal by the access network device.

The fingerprint information base may include a mapping relationship between at least one group of measurement information and intermediate information. Each fingerprint in the fingerprint information base may include, for example, a mapping relationship between one piece of measurement information and one AoD, where the measurement information may include the RSRP information of the access network device. The fingerprint information base may be established by the access network device based on historical information, for example, may be established based on historical information of different AoDs and historical information of RSRP information received by the UE.

The assistance information of the access network device may include the fingerprint information base. The fingerprint base includes a mapping relationship between at least one group of measurement information and an AoD. In a possible implementation, first measurement information obtained through measurement by the UE is matched with the fingerprint information base, to determine the AoD from the access network device to the UE. In another possible implementation, first measurement information measured by the UE may be obtained through calculation on measurement information in a plurality of groups of mapping relationships in the fingerprint information base, and same or corresponding calculation is performed on AoDs corresponding to the measurement information in the plurality of groups of mapping relationships, to determine the AoD from the access network device to the UE. For example, the first measurement information measured by the UE may be obtained by multiplying the measurement information in the plurality of groups of mapping relationships in the fingerprint information base by a group of specific coefficients, and the AoDs corresponding to the measurement information in the plurality of groups of mapping relationships are multiplied by the same group of specific coefficients, to determine the AoD from the access network device to the UE.

The assistance information of the access network device may include the transmit power of the signal of the access network device. The distance from the access network device to the UE may be determined based on the transmit power of the signal of the access network device, a signal received power obtained by the UE through measurement, and a relationship between a power loss and a distance.

The assistance information of the access network device may include the configuration information of the plurality of beams of the access network device. The configuration information of the plurality of beams of the access network device may include, for example, directions of the plurality of beams of the access network device. The AoD from the access network device to the UE may be determined based on the directions of the plurality of beams of the access network device and signal received powers that are of the directions of the plurality of beams of the access network device and that are obtained by the UE through measurement.

The assistance information of the access network device may further include the beam gains of the plurality of beams of the access network device and/or channel quality between the access network device and the UE. The beam gains of the plurality of beams of the access network device and/or the channel quality between the access network device and the UE may be used as a reference for determining the intermediate information. The intermediate information may be determined based on the beam gains of the plurality of beams of the access network device and/or the channel quality between the access network device and the UE and other information. For example, the intermediate information may be determined based on the beam gains of the plurality of beams of the access network device and/or the channel quality between the access network device and the UE and one or more of the following information: the configuration information of the plurality of beams of the access network device, the fingerprint information base of the access network device, or the transmit power for sending the signal by the access network device.

To resolve a problem that the LMF apparatus cannot implement positioning of the UE after receiving the measurement information reported by the UE, this application provides a user equipment UE positioning method. According to this method, the network device may determine the intermediate information used for positioning of the UE, so that positioning of the UE can be implemented.

Figure 3:
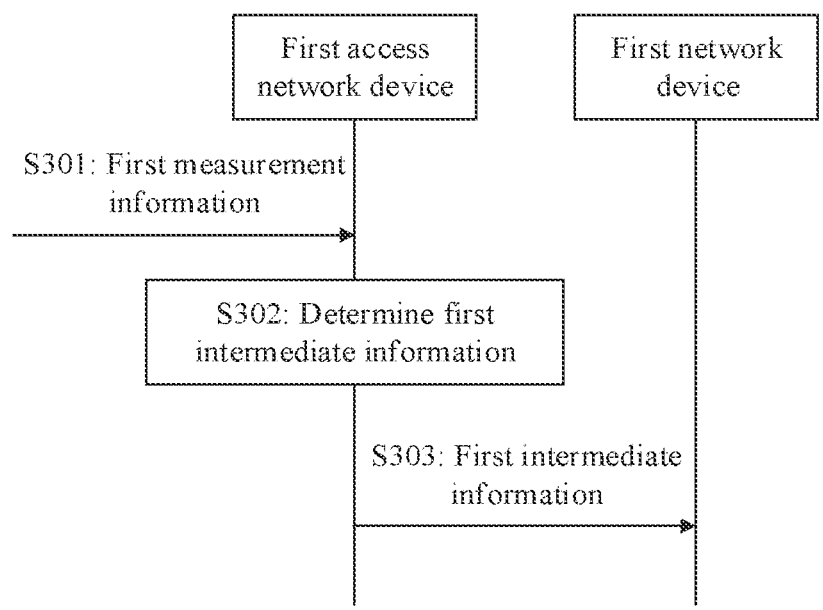
FIG. 3 is a schematic flowchart of a user equipment positioning method according to an embodiment of this application.

FIG. 3 shows a user equipment UE positioning method according to an embodiment of this application.

In step S301, a first access network device receives first measurement information. The first measurement information is obtained by UE by measuring a signal sent by the first access network device.

The signal of the first access network device may be used for UE positioning measurement, for example, may be a downlink positioning reference signal or another downlink signal.

Optionally, the first measurement information may be sent by the UE to the first access network device after the UE receives a second request message sent by an LMF apparatus. The second request message may include positioning request information.

Optionally, the first access network device may further receive an identifier of the first access network device and/or an identifier of a first cell that correspond/corresponds to the first measurement information, where the first cell is a cell in which the UE is located and that is in one or more cells covered by the first access network device. The identifier of the first access network device and/or the identifier of the first cell, and the first measurement information may be carried in a same message or different messages. The first access network device may determine, based on the identifier of the first access network device and/or the identifier of the first cell, that the first measurement information is obtained by the UE by measuring the signal sent by the first access network device.

A type of the first measurement information is not limited in this embodiment of this application. Optionally, the first measurement information may include signal received powers in directions of a plurality of beams of the first access network device, and the like. For example, the first measurement information may include one or more of RSRP information, received signal strength indicator (RSSI) information, received signal strength (received signal strength, RSS) information, or reference signal received quality (RSRQ) information that corresponds to the first access network device. The following uses an example in which the first measurement information is the RSRP information for description.

The RSRP information may include reference signal received powers (RSRP) in the directions of the plurality of beams and/or information determined based on the RSRPs in the directions of the plurality of beams. The information determined based on the RSRPs in the directions of the plurality of beams may include information obtained by performing an operation or processing on the RSRPs in the directions of the plurality of beams. The RSRP information of the first access network device may be the RSRPs in the directions of the plurality of beams of the first access network device and/or the information determined based on the RSRPs in the directions of the plurality of beams of the first access network device. The information determined based on the RSRPs in the directions of the plurality of beams of the first access network device may be information obtained after an operation or processing is performed on RSRPs of the plurality of beams. The operation or processing is performed on the RSRPs of the plurality of beams, for example, reducing numerical precision of the RSRPs to obtain low-precision RSRPs, obtaining a ratio of the RSRPs of the plurality of beams, performing quantization processing to obtain a ratio of the RSRPs of the plurality of beams relative to one of the RSRPs, or another operation or processing manner. The operation or processing is performed on the RSRPs of the plurality of beams, so that a data amount of measurement information can be reduced, and transmission efficiency can be improved. The information determined based on the RSRPs in the directions of the plurality of beams may be an RSRP of one beam, and a ratio of RSRPs of a plurality of other beams relative to the RSRP, may be the low-precision RSRPs of the plurality of beams, or the like. The operation or processing may be performed on the RSRPs of the plurality of beams of the access network device in one or more manners. This is not limited in this embodiment of this application. It should be understood that the RSRP information in another embodiment of this application may also be obtained in the foregoing manner. A manner of performing an operation or processing on the RSRPs of the plurality of beams, and specific content of information that may be included in the RSRP information are not described herein again. Information included in the RSRP information, the RSSI information, the RSS information, and the RSRQ information may also be obtained in a manner similar to the foregoing manner.

If the first access network device is a serving access network device of the UE, the first access network device may receive the first measurement information sent by the UE or a core network apparatus. The UE may send the first measurement information to the first access network device by using radio resource control (RRC) signaling. A core network apparatus AMF apparatus or the core network apparatus LMF apparatus may send the first measurement information to the first access network device by using a non-access stratum (NAS).

Before step S301, the first access network device may send configuration information of the first access network device to the LMF apparatus or the UE. The configuration information of the first access network device may include a configuration of the signal of the first access network device. The signal of the first access network device may be used for UE positioning measurement, for example, may be a downlink positioning reference signal or another signal. After receiving configuration information request information, the first access network device may send the configuration information of the first access network device to the LMF apparatus or the UE. Each of at least one second access network device may send configuration information of the access network device to the LMF apparatus. After receiving a first request message, each of the at least one second access network device may send the configuration information of the access network device to the LMF apparatus. The second access network device may be an access network device near the UE, for example, may be a neighboring cell access network device of the UE. The first request message may include the configuration information request information, and the configuration information request information may be used to request the configuration information of an access network device. The first access network device may send other information such as an identifier of each of the at least one second access network device to the LMF apparatus.

If the first access network device is not the serving access network device of the UE, the first access network device may receive the first measurement information sent by the serving access network device of the UE or the core network apparatus. The serving access network device of the UE may send the first measurement information to the first access network device through an Xn interface application protocol (XnAP).

The first access network device may send the configuration information of the first access network device to the LMF apparatus. After receiving the first request message, the first access network device may send the configuration information of the first access network device to the LMF apparatus. The first request message may be sent by the LMF apparatus.

If the first access network device receives the first measurement information sent by the core network apparatus, the first measurement information may be sent by the UE to the core network apparatus. The UE may further send the identifier of the first access network device and/or the identifier of the first cell to the core network apparatus, where the first cell is the cell in which the UE is located in the one or more cells covered by the first access network device. The identifier of the first access network device and/or the identifier of the first cell, and the first measurement information may be carried in a same message or different messages. The core network apparatus may send the first measurement information to the first access network device based on the identifier of the first access network device and/or the identifier of the first cell that are/is sent by the UE.

In step S302, the first access network device determines first intermediate information based on the first measurement information and first assistance information that is of the first access network device. The first intermediate information is used to determine position information of the UE.

The first measurement information may be used to determine the first intermediate information. The first access network device may determine the first intermediate information based on the first measurement information and the first assistance information.

The first assistance information may include at least one of the following information: configuration information of the plurality of beams of the first access network device, beam gains of the plurality of beams of the first access network device, a feature of a channel between the first access network device and the UE, a fingerprint information base of the first access network device, or a transmit power for sending the signal by the first access network device.

The first intermediate information may include an AoD and/or a distance from the first access network device to the UE.

In step S303, the first access network device sends the first intermediate information to a first network device.

The first access network device may be the serving access network device of the UE.

Optionally, the first access network device may receive at least one piece of second measurement information, where an $i^{th}$ piece of second measurement information in the at least one piece of second measurement information is obtained by the UE by measuring a signal sent by an $i^{th}$ second access network device, and i is a positive integer greater than or equal to 1. The first measurement information and the second measurement information may be sent in one message, or may be separately sent in different messages. In other words, the first measurement information and the second measurement information may be carried in a same message or different messages. For example, the $i^{th}$ piece of second measurement information may be an RSRP of the $i^{th}$ second access network device.

Further, the first access network device may further receive an identifier of a second access network device and/or an identifier of a second cell that correspond/corresponds to each of the at least one piece of second measurement information, where the second cell is a cell in which the UE is located and that is in one or more cells covered by the second access network device. The identifier of the second access network device and/or the identifier of the second cell, and the second measurement information may be carried in a same message or different messages. The first access network device may determine, based on an identifier of the $i^{th}$ second access network device and/or an identifier of a second cell that correspond/corresponds to the $i^{th}$ piece of second measurement information in the at least one piece of second measurement information, that the $i^{th}$ piece of second measurement information is obtained by the UE by measuring a signal sent by the $i^{th}$ second access network device, where i is a positive integer greater than or equal to 1. The first access network device may send, to each of the at least one second access network device based on the identifier of the second access network device and/or the identifier of the second cell that correspond/corresponds to each of the at least one piece of second measurement information, the second measurement information corresponding to the second access network device.

The first access network device may receive the identifier of the first access network device and/or the identifier of the first cell. In other words, the UE may send an identifier of an access network device and/or an identifier of a cell that correspond/corresponds to the first measurement information and each of the at least one piece of second measurement information, without distinguishing whether an access network device corresponding to measurement information is the serving access network device of the UE.

The first access network device may not receive the identifier of the first access network device and/or the identifier of the first cell. In other words, the UE or the core network apparatus may not send the identifier of the first access network device and/or the identifier of the first cell to the first access network device. In measurement information received by the first access network device, the $i^{th}$ piece of second measurement information in the at least one piece of second measurement information corresponds to the identifier of the $i^{th}$ second access network device and/or the identifier of the second cell, and measurement information that has no corresponding identifier is the first measurement information corresponding to the first access network device. The UE may not send the identifier of the first access network device and/or the identifier of the first cell, so that signaling overheads can be reduced.

The first access network device may alternatively receive the identifier of the first access network device and/or the identifier of the first cell. The UE or the core network apparatus may send the identifier of the first access network device and/or the identifier of the first cell to the first access network device. In other words, the UE or the core network apparatus may send an identifier of an access network device and/or an identifier of a cell that correspond/corresponds to the first measurement information and each of the at least one piece of second measurement information, without distinguishing whether an access network device corresponding to measurement information is the serving access network device of the UE.

In a possible implementation, the first access network device may send the $i^{th}$ piece of second measurement information to the $i^{th}$ second access network device in the at least one second access network device. The first access network device may send the $i^{th}$ piece of second measurement information to the $i^{th}$ second access network device based on a received identifier of the at least one second access network device and/or a received identifier of at least one second cell. The second access network device may determine second intermediate information based on the received second measurement information and second assistance information that is of the second access network device. The at least one second access network device may send the second intermediate information to the first network device. The first network device may determine the position information of the UE based on the first intermediate information and at least one piece of second intermediate information. Optionally, the first access network device may further send indication information to each of the at least one second access network device, where the indication information is used to indicate the second access network device to determine, based on the received second measurement information and the second assistance information of the second access network device, the second intermediate information corresponding to the second access network device. The indication information may be further used to indicate the second access network device to send the second intermediate information to the first network device.

In another possible implementation, the first access network device may alternatively receive second assistance information of the at least one second access network device. The second assistance information may include at least one of the following information: configuration information of a plurality of beams of the second access network device, beam gains of the plurality of beams of the second access network device, a feature of a channel between the second access network device and the UE, a fingerprint information base of the second access network device, or a transmit power of a signal of the second access network device. The first access network device may determine second intermediate information based on the at least one piece of second measurement information and the second assistance information. The first network device may determine the position information of the UE based on the first intermediate information and the second intermediate information. The second intermediate information may include an AoD and/or a distance from each of the at least one second access network device to the UE.

In a possible implementation, the first network device may have a location management function, that is, may be an LMF apparatus. The first network device may send the position information of the UE to an AMF apparatus.

In another possible implementation, the first network device may not have a location management function, for example, may be a third access network device. For example, the third access network device has a higher computing capability than the first access network device, or has a capability of calculating a position of the UE. The third access network device may determine the position information of the UE based on the first intermediate information and the at least one piece of second intermediate information. The first network device may send the position information of the UE to an LMF apparatus or an AMF apparatus.

It should be noted that, in all embodiments of this application, measurement information may be obtained by the UE by measuring a signal sent by an access network device. The measurement information may be used to determine intermediate information, and the intermediate information is used to determine the position of the UE. The measurement information may include the first measurement information and the second measurement information. The measurement information may include one or more of the RSRP information, the RSSI information, the RSS information, or the RSRQ information, or may include other information used to determine the intermediate information. The following uses an example in which the measurement information is the RSRP information for description. A similar processing manner is used for the RSSI information, the RSS information, the RSRQ information, and the foregoing other measurement information used to determine the intermediate information, and details are not described again in the following specification.

Figure 4:
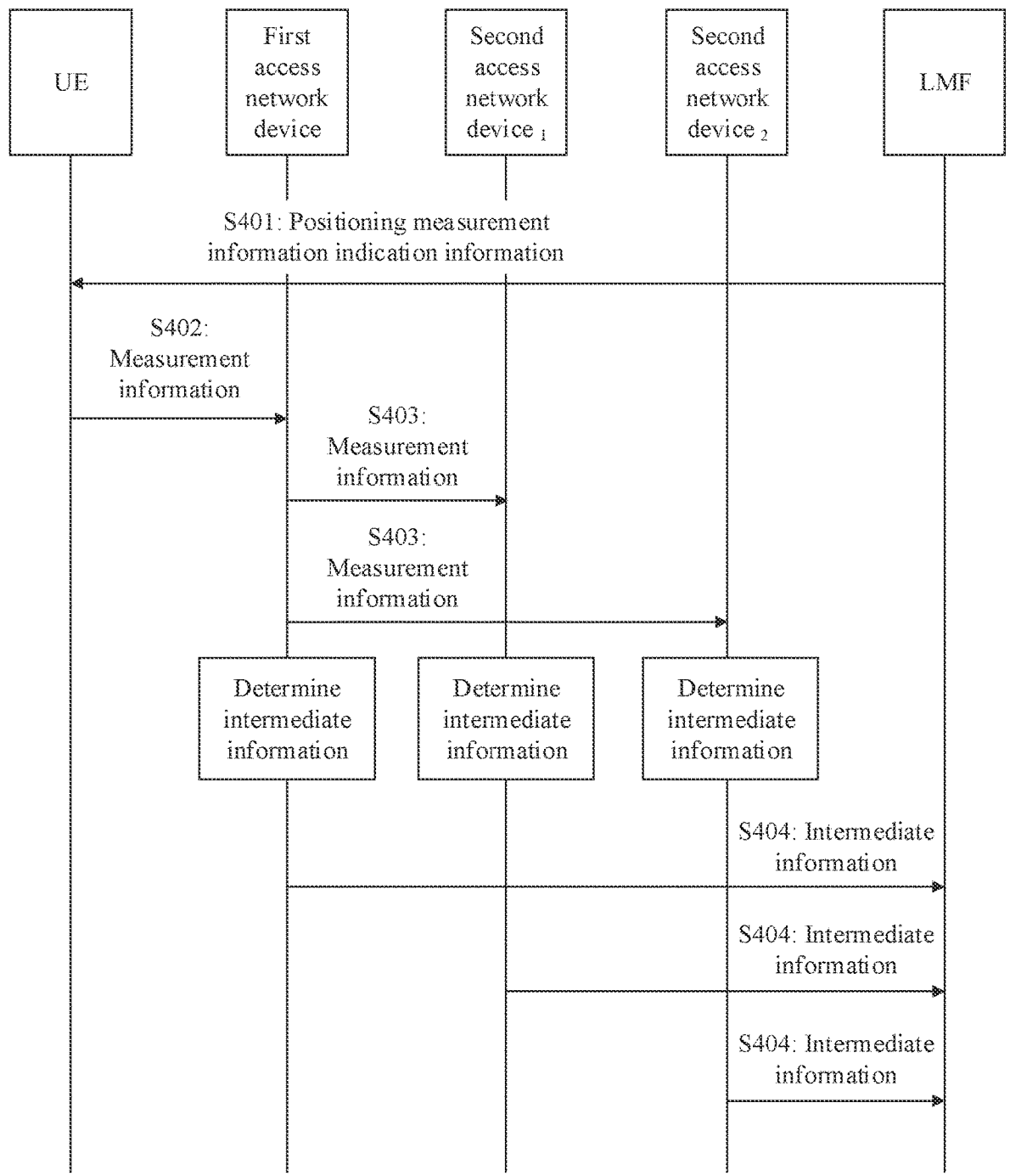
FIG. 4 is a schematic flowchart of a user equipment positioning method according to another embodiment of this application.

FIG. 4 shows another user equipment UE positioning method according to an embodiment of this application. Positioning of UE is implemented by exchanging measurement information between access network devices.

In step S401, an LMF apparatus sends positioning measurement information indication information to UE. The positioning measurement information indication information is used to indicate the UE to send first measurement information and at least one piece of second measurement information to a first access network device.

In a possible implementation, before step S401, the UE may have completed measurement, and store the first measurement information and the at least one piece of second measurement information. In another possible implementation, after receiving the positioning measurement information indication information, the UE performs measurement to obtain the first measurement information and the at least one piece of second measurement information.

Optionally, the LMF apparatus may send a positioning measurement information measurement request to the UE. The positioning measurement information measurement request is used to indicate the UE to perform measurement. The LMF apparatus may send the positioning measurement information measurement request to the UE before step S401. The LMF apparatus may alternatively send the positioning measurement information indication information and the positioning measurement information measurement request to the UE at the same time. In other words, the positioning measurement information indication information and the positioning measurement information measurement request may be carried in a same message or different messages.

The UE may receive configuration information of the first access network device and configuration information of at least one second access network device. Configuration information of an access network device may include a configuration of a signal of the access network device. The signal of the access network device may be used for UE positioning measurement, for example, may be a downlink positioning reference signal or another downlink signal. The UE may measure the signal of the access network device based on the configuration information of the access network device, to obtain the measurement information. The measurement information may be signal received powers in directions of a plurality of beams of the access network device. For example, the measurement information may be RSRP information. The RSRP information may include RSRPs of the plurality of beams of the access network device and/or information determined based on the RSRPs in the directions of the plurality of beams. The information determined based on the RSRPs in the directions of the plurality of beams may include information obtained after an operation or processing is performed on the RSRPs of the plurality of beams of the access network device.

In step S402, the UE sends the first measurement information and the at least one piece of second measurement information to the first access network device.

The first measurement information may be obtained by the UE by measuring a signal sent by the first access network device. An $i^{th}$ piece of second measurement information may be obtained by the UE by measuring a signal sent by an $i^{th}$ second access network device, where i is a positive integer greater than or equal to 1. The first access network device may be a serving access network device of the UE. The second access network device may be another access network device near the UE, for example, a neighboring cell access network device.

Optionally, the UE may send the first measurement information and the at least one piece of second measurement information to the first access network device through RRC signaling. The first measurement information and the at least one piece of second measurement information may be carried in a same message or different messages.

Optionally, the UE may further send an identifier of the at least one second access network device and/or an identifier of at least one second cell to the first access network device, where the second cell may be a cell covered by the second access network device. The identifier of the at least one second access network device and/or the identifier of the at least one second cell, and the at least one piece of second measurement information may be carried in a same message or different messages. The first access network device may send, to each of the at least one second access network device based on an identifier of the second access network device and/or an identifier of a second cell that correspond/corresponds to each of the at least one piece of second measurement information, second measurement information corresponding to the second access network device.

Optionally, the UE may further send an identifier of the first access network device and/or an identifier of a first cell to the first access network device, where the first cell may be a cell covered by the first access network device. The identifier of the first access network device and/or the identifier of the first cell, and the first measurement information may be carried in a same message or different messages. In other words, the UE may send an identifier of an access network device and/or an identifier of a cell that correspond/corresponds to the first measurement information and each of the at least one piece of second measurement information, without distinguishing whether an access network device corresponding to measurement information is the serving access network device of the UE.

Alternatively, the UE may not send the identifier of the first access network device and/or the identifier of the first cell to the first access network device. In measurement information received by the first access network device, each $i^{th}$ piece of second measurement information in the at least one piece of second measurement information corresponds to an identifier of the $i^{th}$ second access network device and/or an identifier of an $i^{th}$ second cell. In the measurement information received by the first network device, there is second measurement information that has no corresponding identifier. The measurement information that has no corresponding identifier is the first measurement information corresponding to the first access network device.

The UE may send a measurement information report message to the first access network device, and the measurement information report message may include the first measurement information and the at least one piece of second measurement information. The measurement information report message may further include the identifier of the at least one second access network device and/or the identifier of the at least one second cell. The measurement information report message may further include the identifier of the first access network device and/or the identifier of the first cell.

According to step S402, the UE may report measurement information to the first access network device. Reported information may include the measurement information. Optionally, the reported information may further include an identifier of the access network device and/or an identifier of a cell corresponding to the measurement information, and the cell is a cell in which the UE is located and that is in one or more cells covered by the access network device.

In step S403, the first access network device sends the $i^{th}$ piece of second measurement information to the $i^{th}$ second access network device.

The first access network device may send the $i^{th}$ piece of second measurement information to the $i^{th}$ second access network device through an XnAP.

The first access network device may send a measurement information transfer message to the $i^{th}$ second access network device, where the measurement information transfer message may include the $i^{th}$ piece of second measurement information.

The first access network device may send the $i^{th}$ piece of second measurement information to the $i^{th}$ second access network device based on the identifier of the $i^{th}$ second access network device and/or an identifier of a second cell that are/is sent by the UE. The first access network device may further send the identifier of the second access network device and/or an identifier of a coverage cell of the second access network device to each of the at least one second access network device. The identifier of the coverage cell of the second access network device may include an identifier of a cell in which the UE is located and that is in one or more cells covered by the second access network device.

Optionally, the first access network device may further send indication information to each of the at least one second access network device, where the indication information is used to indicate the second access network device to determine, based on the received second measurement information and the second assistance information of the second access network device, second intermediate information corresponding to the second access network device. The indication information may further indicate the second access network device to send the second intermediate information to the LMF apparatus.

According to step S403, the first access network device that serves as the serving access network device may send, to a corresponding neighboring cell access network device, measurement information that is fed back by the UE and that is obtained by the UE by measuring the neighboring cell access network device.

In step S404, the first access network device sends first intermediate information to the first network device, and the $i^{th}$ second access network device sends an $i^{th}$ piece of second intermediate information to the first network device.

The first intermediate information is determined based on the first measurement information and assistance information of the first access network device. The $i^{th}$ piece of second intermediate information is determined based on the $i^{th}$ piece of second measurement information and assistance information of the $i^{th}$ second access network device.

First assistance information may include at least one of the following information: configuration information of a plurality of beams of the first access network device, beam gains of the plurality of beams of the first access network device, a feature of a channel between the first access network device and the UE, a fingerprint information base of the first access network device, a transmit power for sending the signal by the first access network device, or the transmit power of a signal of the first access network device. The second assistance information may include at least one of the following information: configuration information of a plurality of beams of the second access network device, beam gains of the plurality of beams of the second access network device, a feature of a channel between the second access network device and the UE, a fingerprint information base of the second access network device, a transmit power for sending the signal by the second access network device, or the transmit power of a signal of the second access network device.

Before step S403, the first access network device may determine the first intermediate information based on the first measurement information and the assistance information of the first access network device. The first intermediate information may include an AoD and/or a distance of the UE relative to the first access network device. The second access network device may determine the second intermediate information based on the second measurement information and assistance information of the second access network device. The second intermediate information may include an AoD and/or a distance of the UE relative to the second access network device.

The first network device may determine position information of the UE based on the first intermediate information and at least one piece of second intermediate information. The first network device may determine a position of the UE based on intermediate information reported by each access network device.

The first network device may be a device having an LMF function, or may be a device not having an LMF function. The first network device may be an LMF apparatus located in a core network, or may be another network device having an LMF function. If the first network device has an LMF function, the first network device may send the position information of the UE to an AMF apparatus.

If the first network device is an access network device that does not have an LMF function, in some embodiments, in step S404, the first network device may also be a third access network device. The first access network device sends the first intermediate information to the first network device, and the $i^{th}$ second access network device sends the $i^{th}$ piece of second intermediate information to the first network device. Compared with the first access network device or the at least one second access network device, the third access network device has a relatively strong computing capability, or the third access network device has a capability of calculating the position of the UE.

In some embodiments, in step S404, the first network device may be one of the first access network device or the at least one second access network device. If the first network device is the first access network device, the $i^{th}$ second access network device sends the $i^{th}$ piece of second intermediate information to the first network device, and the first access network device does not need to send the first intermediate information. If the first network device is one of the at least one second access network device, another second access network device in the at least one second access network device sends second intermediate information of the second access network device to the first network device, and the first access network device sends the first intermediate information to the first network device.

FIG. 4 is described by using an example in which the first network device is an LMF apparatus. If the first network device is the LMF apparatus, the first network device may send the position information of the UE to the AMF apparatus. An access network device may send intermediate information to the first network device through a new radio (NR) positioning protocol annex (NRPPa). The access network device may send a location information reply (location information report) message to the LMF apparatus, to send the intermediate information to the LMF apparatus. The first access network device may send a first location information reply (location information report) message to the LMF apparatus, where the first location information reply message may include the first intermediate information. The $i^{th}$ second access network device may send an $i^{th}$ second location information reply message to the LMF apparatus, where the $i^{th}$ second location information reply message includes the $i^{th}$ piece of second intermediate information.

According to step S404, each access network device may report intermediate information determined based on measurement information of the UE to the first network device.

Figure 5:
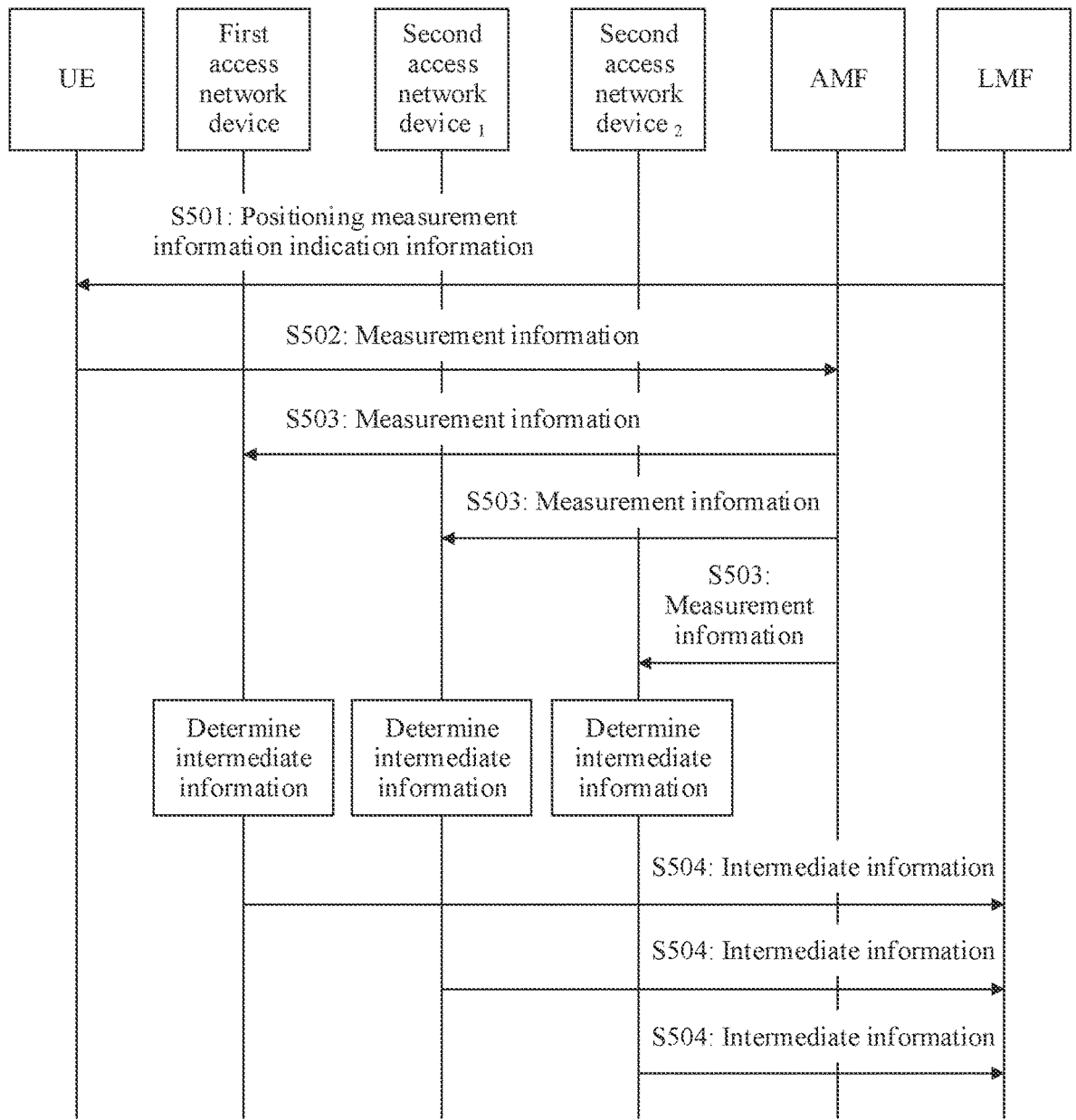
FIG. 5 is a schematic flowchart of a user equipment positioning method according to still another embodiment of this application.

FIG. 5 shows still another user equipment UE positioning method according to an embodiment of this application. Positioning of UE is implemented by exchanging measurement information between a core network apparatus and an access network device.

In step S501, an LMF apparatus sends positioning measurement information indication information to UE. The positioning measurement information indication information is used to indicate the UE to send measurement information to the core network apparatus. The measurement information may be obtained by the UE by measuring signals sent by a plurality of access network devices. The plurality of access network devices may be access network devices near the UE, and may include a serving access network device of the UE, or may include only neighboring cell access network devices of the UE.

The core network apparatus may be an AMF apparatus, an LMF apparatus, or the like.

The UE may measure the signals sent by the plurality of access network devices, to obtain the measurement information. The measurement information may include RSRP information that is of an $i^{th}$ access network device in the plurality of access network devices and that is measured by the UE. The RSRP information that is of the $i^{th}$ access network device and that is measured by the UE may include RSRPs of a plurality of beams of the $i^{th}$ access network device and/or information determined based on RSRPs in directions of the plurality of beams, where i is a positive integer greater than or equal to 1. The information determined based on the RSRPs in the directions of the plurality of beams of the $i^{th}$ access network device may include information obtained after an operation or processing is performed on the RSRPs of the plurality of beams of the $i^{th}$ access network device, and may be the RSRPs in the directions of the plurality of beams of the $i^{th}$ access network device and/or the information determined based on the RSRPs in the directions of the plurality of beams of the $i^{th}$ access network device. The information determined based on the RSRPs in the directions of the plurality of beams of the $i^{th}$ access network device may include information obtained after an operation or processing is performed on the RSRPs in the directions of the plurality of beams of the $i^{th}$ access network device.

In a possible implementation, before step S501, the UE may have completed measurement and stored the measurement information. In another possible implementation, after receiving the positioning measurement information indication information, the UE performs measurement to obtain the measurement information.

Optionally, the LMF apparatus may send a positioning measurement information measurement request to the UE. The positioning measurement information measurement request is used to indicate the UE to perform measurement. The LMF apparatus may send the positioning measurement information measurement request to the UE before step S501. The LMF apparatus may alternatively send the positioning measurement information indication information and the positioning measurement information measurement request to the UE at the same time. The positioning measurement information indication information and the positioning measurement information measurement request may be carried in a same message or different messages.

In step S502, the UE sends a plurality of pieces of measurement information to the core network apparatus.

An $i^{th}$ piece of measurement information in the plurality of pieces of measurement information is obtained by the UE by measuring a signal sent by the $i^{th}$ access network device in the plurality of access network devices.

The plurality of pieces of measurement information may be carried in a same message or different messages. The UE may send the plurality of pieces of measurement information to the core network apparatus by using a NAS. The UE may send a measurement information report (measurements report) message to the core network apparatus, and the measurement information report message may include the plurality of pieces of measurement information.

The UE may further send identifiers of the plurality of access network devices and/or identifiers of coverage cells of the plurality of access network devices to the core network apparatus. An identifier of the $i^{th}$ access network device in the plurality of access network devices and/or an identifier of an $i^{th}$ cell covered by the $i^{th}$ access network device correspond/corresponds to the $i^{th}$ piece of measurement information. The identifier of the $i^{th}$ access network device and/or the identifier of the $i^{th}$ cell, and the $i^{th}$ piece of measurement information may be carried in a same message or different messages. The measurement information report message may include the identifiers of the plurality of access network devices and/or identifiers of a plurality of cells, and the $i^{th}$ cell in the plurality of cells is a cell in which the UE is located and that is in one or more cells covered by the $i^{th}$ access network device. The core network device may determine, based on the identifier of the $i^{th}$ access network device and/or the identifier of the $i^{th}$ cell, the $i^{th}$ access network device corresponding to the $i^{th}$ piece of measurement information. The core network device may send the $i^{th}$ piece of measurement information to the $i^{th}$ access network device based on the identifier of the $i^{th}$ access network device and/or the identifier of the $i^{th}$ cell.

According to step S502, the UE may report the measurement information to the core network apparatus. Reported information may further include an identifier of an access network device and/or an identifier of a cell that correspond/corresponds the measurement information.

In step S503, the core network apparatus sends the $i^{th}$ piece of measurement information to the $i^{th}$ access network device.

The core network apparatus may send a measurement information transfer (measurements transfer) message to the $i^{th}$ access network device, where the measurement information transfer message may include the $i^{th}$ piece of measurement information. The core network apparatus may be the AMF apparatus, and the core network apparatus may send the $i^{th}$ piece of measurement information to the $i^{th}$ access network device through an NG interface application protocol (NGAP). The core network apparatus may be the LMF apparatus, and the core network apparatus may send the $i^{th}$ piece of measurement information to the $i^{th}$ access network device through an NRPPa.

Optionally, the core network apparatus may send the $i^{th}$ piece of measurement information to the $i^{th}$ access network device based on the identifier of the $i^{th}$ access network device and/or the identifier of the $i^{th}$ cell that are/is sent by the UE.

Optionally, the core network apparatus may send indication information to the $i^{th}$ access network device, to indicate the $i^{th}$ access network device to determine an $i^{th}$ piece of intermediate information based on the $i^{th}$ piece of measurement information and assistance information of the $i^{th}$ access network device. The indication information may be further used to indicate the $i^{th}$ access network device to send the $i^{th}$ piece of intermediate information to the LMF apparatus.

According to step S503, the core network apparatus (for example, the AMF apparatus or the LMF apparatus) sends, to a corresponding access network device, measurement information that is obtained by the UE by measuring the access network device and that is fed back by the UE.

In step S504, the $i^{th}$ access network device sends the $i^{th}$ piece of intermediate information to a network device.

The $i^{th}$ piece of intermediate information is determined based on the $i^{th}$ piece of measurement information and the assistance information of the $i^{th}$ access network device. The $i^{th}$ piece of intermediate information may be an AoD of the UE relative to the $i^{th}$ access network device, or may be a distance between the UE and the $i^{th}$ access network device. The assistance information of the $i^{th}$ access network device may include at least one of the following information: configuration information of the plurality of beams of the $i^{th}$ access network device, beam gains of the plurality of beams of the $i^{th}$ access network device, a feature of a channel between the $i^{th}$ access network device and the UE, a fingerprint information base of the $i^{th}$ access network device, a transmit power for sending the signal by the $i^{th}$ access network device, or a transmit power of a signal of the $i^{th}$ access network device.

According to step S504, each access network device reports intermediate information determined based on the measurement information of the UE to a first network device.

The first network device may determine position information of the UE based on a plurality of pieces of intermediate information.

The first network device may be a device having an LMF function, or may be a device not having an LMF function. If the network device has an LMF function, the first network device may be a core network LMF apparatus, or may be another network device having an LMF function. An example in which the first network device is the LMF apparatus is used for description in FIG. 5. The first network device may send the position information of the UE to the AMF. If the first network device does not have an LMF function, for example, the first network device is another access network device, the first network device may send the position information of the UE to the LMF apparatus. The access network device may send the intermediate information to the first network device through an NRPPa. The access network device may send a location information reply (location information report) message to the LMF apparatus, where the location information reply message may include the intermediate information.

Figure 6:
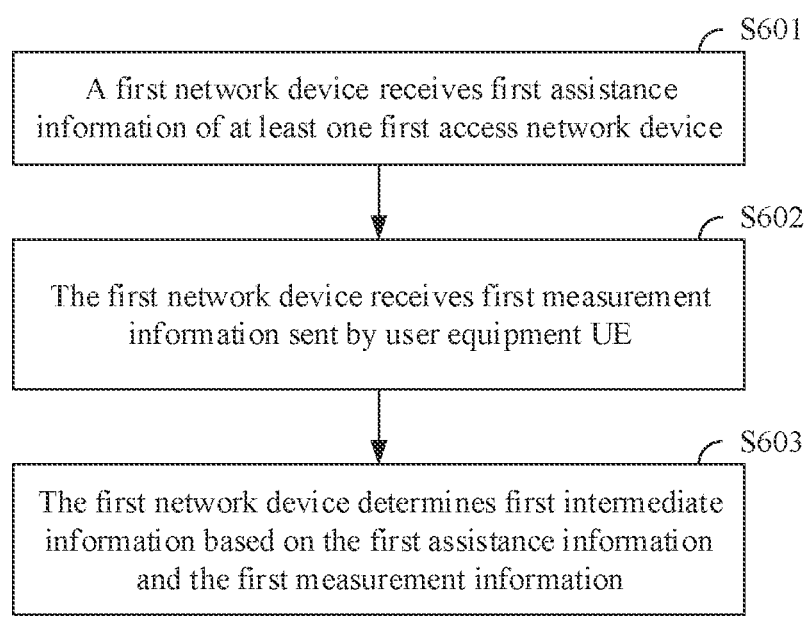
FIG. 6 is a schematic flowchart of a user equipment positioning method according to still another embodiment of this application.

FIG. 6 shows still another user equipment UE positioning method according to an embodiment of this application.

In step S601, a first network device receives first assistance information of at least one first access network device.

Optionally, the first assistance information may be sent by the first access network device to the first network device after the first access network device receives assistance information request information. The assistance information request information is used to request first assistance information of the first access network device.

The first network device may be a second access network device. The first assistance information may be sent by the first access network device to the first network device through an XnAP. The assistance information request information may be sent by an LMF apparatus.

Optionally, the first assistance information is sent by each of the at least one first access network device to the first network device after each of the at least one first access network device receives an identifier of the first network device and/or an identifier of a second cell. The second cell is a cell covered by the first network device, for example, may be a cell in which UE is located and that is in one or more cells covered by the first network device. The identifier of the first network device and the assistance information request information may be carried in a same message or different messages. Each of the first access network devices may send the first assistance information to the first network device based on the identifier of the first network device and/or the identifier of the second cell.

The first network device may be the LMF apparatus. The first assistance information may be sent by the first access network device to the first network device through an NRPPa. Before performing step S601, the first network device may send the assistance information request information to each of the at least one first access network device.

The first assistance information may include at least one of the following information: configuration information of a plurality of beams of the first access network device, beam gains of the plurality of beams of the first access network device, a feature of a channel between the first access network device and the UE, a fingerprint information base of the first access network device, a transmit power for sending the signal by the first access network device, or the transmit power of a signal of the first access network device.

In step S602, the first network device receives first measurement information sent by the user equipment UE.

The first measurement information is obtained by the UE by measuring a signal sent by the at least one first access network device. The first measurement information may include received powers of the plurality of beams of the access network device, for example, may include RSRP information of the access network device. The RSRP information may be RSRPs of the plurality of beams of the access network device and/or information determined based on the RSRPs in directions of the plurality of beams of the access network device. The information determined based on the RSRPs in the directions of the plurality of beams of the access network device may include information obtained after an operation or processing is performed on the RSRPs of the plurality of beams of the access network device.

Optionally, the first measurement information may be sent by the UE after the UE receives first measurement information request information, and the first measurement information request information may be used to request the first measurement information. The first measurement information request information may also be referred to as a first positioning measurement information request or first positioning measurement information indication information.

Before receiving the first measurement information request information, the UE may have completed measurement and store the first measurement information. Alternatively, after receiving the first measurement information request information, the UE performs measurement to obtain the first measurement information.

The signal of the first access network device may be used for UE positioning measurement, for example, may be a downlink positioning reference signal or another downlink signal.

Optionally, the first network device may receive an identifier of the at least one first access network device and/or an identifier of at least one first cell that are/is sent by the user equipment UE. An $i^{th}$ first cell in the at least one first cell is a cell in which the UE is located and that is in one or more cells covered by an $i^{th}$ first access network device in the at least one first access network device, where i is a positive integer greater than or equal to 1. The first network device may determine, based on an identifier of the $i^{th}$ first access network device in the at least one first access network device and/or an identifier of the $i^{th}$ first cell, the $i^{th}$ first access network device corresponding to an $i^{th}$ piece of first measurement information in the first measurement information. On this basis, the first network device may determine an its piece of first intermediate information in first intermediate information based on an $i^{th}$ piece of first assistance information and the $i^{th}$ piece of first measurement information of the $i^{th}$ first access network device.

In step S603, the first network device determines the first intermediate information based on the first assistance information and the first measurement information.

The first intermediate information may include an AoD and/or a distance from the at least one first access network device to the UE.

In a possible implementation, the first network device may be the LMF apparatus.

The first measurement information request information may be sent by the first network device.

Before step S602, the first network device may receive first configuration information sent by each of the at least one first access network device. The first configuration information may include a configuration of the signal of the first access network device. The signal of the first access network device may be used for UE positioning measurement, for example, may be a downlink reference signal or another signal. Before the first network device receives the first configuration information sent by each of the at least one first access network device, the first network device may send configuration information request information to each of the at least one first access network device. Before step S602, the first network device may send the first configuration information of each of the at least one first access network device to the UE. Each piece of first configuration information may be used by the UE to measure a signal of a corresponding first access network device. The UE may obtain the first measurement information by measuring the signal of the at least one first access network device.

The first configuration information and the first assistance information may be sent to the first network device by using different messages or a same message. That is, the first configuration information and the first assistance information may be carried in a same message or different messages. The first network device may send the assistance information request information and the configuration information request information to the first access network device by using different messages or a same message.

In another possible implementation, the first network device may be the second access network device.

The first measurement information request information may be sent by the LMF apparatus.

Before step S602, the first access network device may send the first configuration information of the first access network device to the LMF apparatus. The first configuration information may include a configuration of the signal of the first access network device. The signal of the first access network device may be used for UE positioning measurement, for example, may be a downlink reference signal or another signal. After receiving configuration information request information sent by the LMF apparatus, the first access network device may send the first configuration information to the LMF apparatus. The LMF apparatus may send the first configuration information to the UE. The UE may measure the signal of the first access network device based on the first configuration information, to obtain the first measurement information.

Before step S602, the first network device may send second configuration information to the LMF apparatus. The second configuration information may include a configuration of a signal of the first network device. The signal of the first network device may be used for UE positioning measurement, for example, may be a downlink reference signal or another signal. After receiving the configuration information request information sent by the LMF apparatus, the first network device may send the second configuration information to the LMF apparatus. The LMF apparatus may send the second configuration information to the UE. The UE may measure the signal of the first network device based on the second configuration information, to obtain second measurement information.

The UE may send the first measurement information and/or the second measurement information to the first network device through RRC signaling.

The first measurement information and/or the second measurement information may be forwarded through another network device. For example, the first measurement information and/or the second measurement information is sent by the UE to a core network element device such as an AMF apparatus or an LMF apparatus, and then is sent by the core network element device to the first network device.

In some embodiments, the first network device may be the second access network device. For example, the first network device may be a serving access network device of the UE. The first network device may receive the second measurement information sent by the UE, where the second measurement information is obtained by the UE by measuring the signal sent by the first network device. The first measurement information and the second measurement information may be carried in a same message or different messages. The first network device determines second intermediate information based on the second measurement information and second assistance information of the first network device.

The first measurement information and/or the second measurement information may be forwarded through another network device. For example, the first measurement information and/or the second measurement information is sent by the UE to the AMF apparatus, and then is sent by the AMF apparatus to the first network device.

Optionally, the second measurement information may be sent by the UE after the UE receives second measurement information request information, and the second measurement information request information may be used to request the second measurement information. Before receiving the second measurement information request information, the UE may have completed measurement and store the second measurement information. Alternatively, after receiving the second measurement information request information, the UE performs measurement to obtain the second measurement information.

Further, the first network device may receive the identifier of the first network device and/or the identifier of the second cell that are/is sent by the UE, where the second cell is a cell in which the UE is located and that is in one or more cells covered by the first network device. The identifier of the first network device and/or the identifier of the second cell, and the second measurement information may be carried in a same message or different messages. The first network device may determine, based on the identifier of the first network device and/or the identifier of the second cell, that the second measurement information is obtained by the UE by measuring the signal of the first network device. In other words, the first network device may determine, based on the identifier of the first network device and/or the identifier of the second cell, that the second measurement information corresponds to the first network device. The UE may send the identifier of the at least one first access network device and/or the identifier of the at least one first cell, and the identifier of the first network device and/or the identifier of the second cell. The UE may not need to send different information types depending on whether an access network device is the serving access network device of the UE.

Alternatively, the first network device may not receive the identifier of the first network device and/or the identifier of the second cell that are/is sent by the UE. The first network device may determine, based on the identifier of the $i^{th}$ first access network device in the at least one first access network device and/or the identifier of the $i^{th}$ first cell, the $i^{th}$ first access network device corresponding to the $i^{th}$ piece of first measurement information in the first measurement information. In the measurement information received by the first network device, there is second measurement information that has no corresponding identifier. The second measurement information that has no corresponding identifier corresponds to the first network device.

Optionally, the first assistance information is sent to the first network device after each of the at least one first access network device receives the identifier of the first network device and/or the identifier of the second cell that are/is sent by the LMF apparatus. Each of the at least one first access network device may send the first assistance information to the first network device based on the identifier of the first network device and/or the identifier of the second cell that are/is sent by the LMF apparatus. The second cell is the cell covered by the first network device, for example, may be the cell in which UE is located and that is in the one or more cells covered by the first network device. The LMF apparatus may send the assistance information request information to the at least one first access network device. The identifier of the first network device and the assistance information request information may be carried in a same message or different messages.

Optionally, the first access network device may send the identifier of the first access network device and/or the identifier of the first cell to the first network device. The identifier of the first access network device and the first assistance information may be carried in a same message, or may be carried in different messages. The first network device may determine, based on the identifier of the $i^{th}$ first access network device in the at least one first access network device and/or the identifier of the $i^{th}$ first cell that are/is sent by the UE, and the identifier of the $i^{th}$ first access network device and/or the identifier of the $i^{th}$ first cell that are/is sent by the $i^{th}$ first access network device in the at least one first access network device, a correspondence between the $i^{th}$ piece of first measurement information in the first measurement information and the $i^{th}$ piece of first assistance information in the first assistance information. Therefore, the first network device may determine the $i^{th}$ piece of first intermediate information based on the $i^{th}$ piece of first measurement information and the $i^{th}$ piece of first assistance information.

In a possible implementation, the first network device determines position information of the UE based on the first intermediate information and the second intermediate information. The first network device may send the position information to the second network device. The second network device may have an LMF function. For example, the second network device may be a base station or another LMF apparatus having an LMF function. The second network device may alternatively be an AMF apparatus.

In another possible implementation, the first network device sends the first intermediate information and the second intermediate information to the second network device. The second network device may be a third access network device, or the second network device may be an LMF apparatus. The second network device may determine the position information of the UE based on the first intermediate information and the second intermediate information.

In some other embodiments, the first network device may be the LMF apparatus. The first network device determines the position information of the UE based on the first intermediate information. The first network device may send the position information of the UE to an AMF apparatus.

The UE may send a measurement information report message to the first network device. The measurement information report message may include the first measurement information, and may further include the second measurement information.

Figure 7:
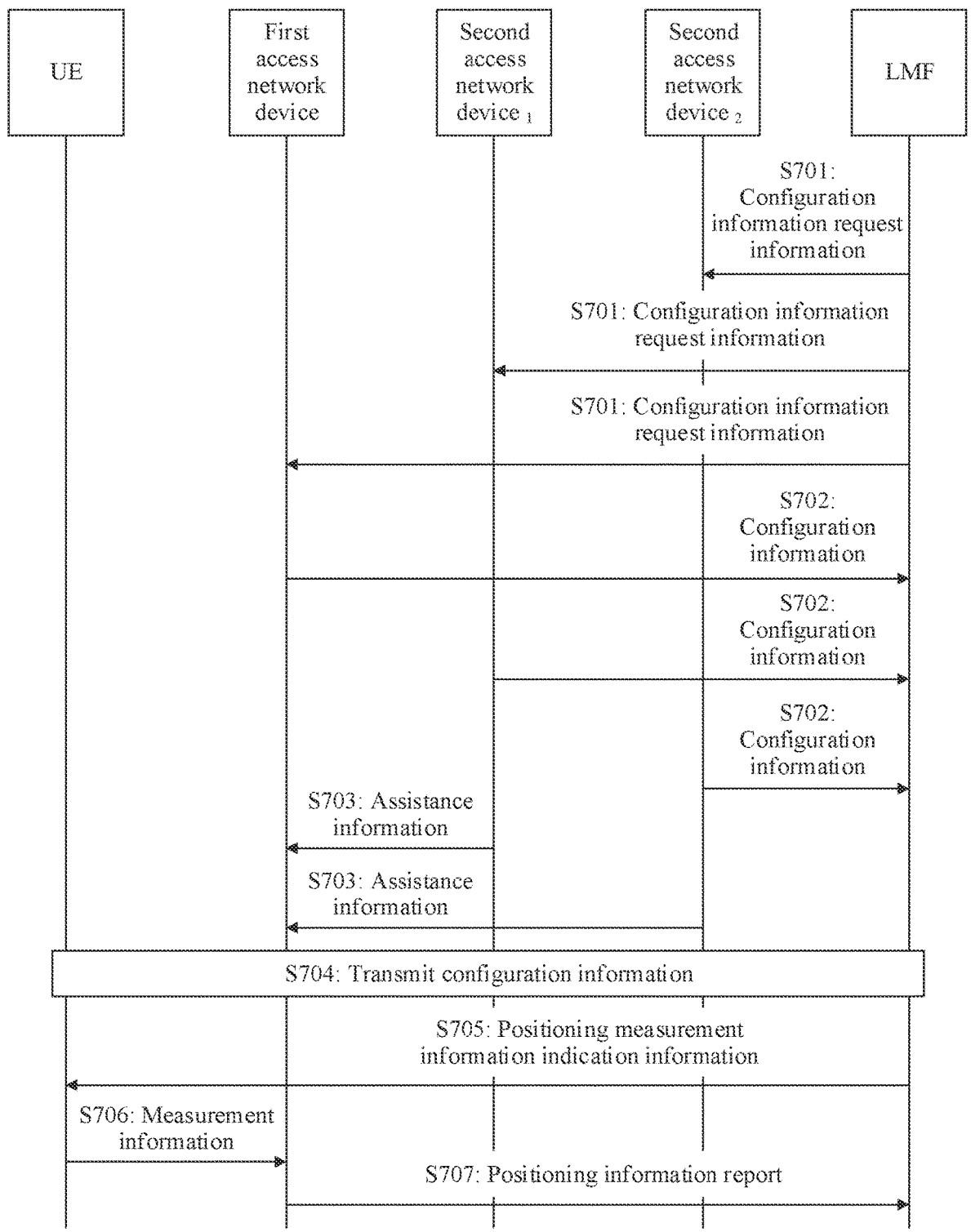
FIG. 7 is a schematic flowchart of a user equipment positioning method according to still another embodiment of this application.

FIG. 7 shows still another user equipment UE positioning method according to an embodiment of this application. In the method, a first access network device receives second assistance information of at least one second access network device. The first access network device receives first measurement information and second measurement information, where the first measurement information is obtained by user equipment UE by measuring a signal sent by the first access network device, and the second measurement information is obtained by the UE by measuring a signal sent by the at least one second access network device. The first access network device determines first intermediate information based on the first measurement information and first assistance information of the first access network device, and determines second intermediate information based on the second measurement information and second assistance information of each of the at least one second access network device, where the first intermediate information and the second intermediate information are used to determine position information of the UE. The method includes steps S701 to S707.

In step S701, an LMF apparatus may send configuration information request information to the first access network device and the at least one second access network device. After receiving the configuration information request information, an access network device may send configuration information of the access network device to the LMF apparatus. Configuration information of the first access network device may include a configuration of the signal of the first access network device. The signal of the first access network device may be used for positioning of the UE. The signal of the first access network device may be, for example, a downlink reference signal. Configuration information of the second access network device may include a configuration of the signal of the second access network device. The signal of the second access network device may be used for positioning of the UE.

The LMF apparatus may further send assistance information request information to the at least one second access network device, to request each of the at least one second access network device to send second assistance information of the second access network device to the first access network device. The second assistance information may include at least one of the following information: configuration information of a plurality of beams of the second access network device, beam gains of the plurality of beams of the second access network device, a feature of a channel between the second access network device and the UE, a fingerprint information base of the second access network device, a transmit power for sending the signal by the second access network device, or the transmit power of a signal of the second access network device.

Optionally, the LMF apparatus may send an identifier of the first access network device and/or an identifier of a first cell to the at least one second access network device, where the first cell is a cell covered by the first access network device. For example, the first cell may be a cell in which the UE is located and that is in one or more cells covered by the first access network device. The identifier of the first access network device and the assistance information request information may be carried in a same message or different messages. When the LMF apparatus requests assistance information and/or the configuration information from the at least one second access network device near the UE, in other words, when the LMF apparatus sends the assistance information request information and/or the configuration information request information to the at least one second access network device, the LMF apparatus may send the identifier of the first access network device and/or the identifier of the first cell to the at least one second access network device. Each of the at least one second access network device may send the first assistance information to the first access network device based on the identifier of the first access network device sent by the LMF apparatus.

The configuration information request information and the assistance information request information that are sent by the LMF apparatus to each of the at least one second access network device may be carried in a same message or different messages.

The first access network device and the second access network device may be access network devices near the UE. The first access network device may be a serving access network device of the UE. The second access network device may be another access network device near the UE, for example, a neighboring cell access network device.

Optionally, after receiving the configuration information request information, an $i^{th}$ second access network device may perform step S702. After receiving the configuration information request information, the first access network device may perform step S702, where i is a positive integer greater than or equal to 1.

In step S702, the first access network device sends configuration information of the signal of the first access network device to the LMF apparatus, and the $i^{th}$ second access network device in the at least one second access network device sends configuration information of a signal of the $i^{th}$ second access network device to the LMF apparatus.

In step S703, each of the at least one second access network device sends the second assistance information of the second access network device to the first access network device.

Optionally, the second access network device sends an identifier of the second access network device and/or an identifier of a second cell to the first access network device. The identifier of the second access network device and/or an identifier of an $i^{th}$ second cell, and the second assistance information may be carried in a same message or different messages. The first access network device may determine a correspondence between an $i^{th}$ piece of second measurement information in the second measurement information and an $i^{th}$ piece of second assistance information in the second assistance information based on an identifier sent by the UE and the identifier sent by the at least one second access network device. Therefore, the first access network device may determine an $i^{th}$ piece of second intermediate information based on the $i^{th}$ piece of second measurement information and the $i^{th}$ piece of second assistance information.

Optionally, the second access network device may send the second assistance information to the first access network device through an XnAP.

After receiving the configuration information request information, or after reporting the configuration information used for positioning to the LMF apparatus, for example, a configuration of a downlink positioning reference signal, a non-serving access network device of the UE sends, to the serving access network device, assistance information that needs to be used for determining intermediate information.

Optionally, after receiving the assistance information request information, the $i^{th}$ second access network device may perform step S703. In other words, after receiving the assistance information request information, the $i^{th}$ second access network device may send the $i^{th}$ piece of second assistance information to the first access network device.

In step S704, configuration information is transmitted. The LMF apparatus may send configuration information of the signal of the first access network device and configuration information of the signal of each of the at least one second access network device to the UE. Configuration information of a signal may be used by the UE to measure the signal to obtain the first measurement information and the second measurement information.

Optionally, the LMF apparatus may send an identifier to the UE. The identifier may include the identifier of the first access network device and/or the identifier of the first cell. The identifier may further include the identifier of the at least one second access network device and/or an identifier of at least one second cell. The identifier of the first access network device and/or the identifier of the first cell, and the configuration information of the signal of the first access network device may be carried in a same message, or may be carried in different messages. An identifier of the $i^{th}$ second access network device in the at least one second access network device and/or the identifier of the $i^t$ second cell, and the configuration information of the signal of the $i^{th}$ second access network device may be carried in a same message, or may be carried in different messages. The $i^{th}$ second cell is a cell covered by the $i^{th}$ second access network device, for example, may be a cell in which the UE is located and that is in one or more cells covered by the $i^{th}$ second access network device. The UE may measure signals of the first access network device and the at least one second access network device based on the identifier sent by the LMF apparatus.

Step S705: The LMF apparatus sends positioning measurement information indication information to the UE, where the positioning measurement information indication information may be used to indicate the UE to send measurement information to the first access network device.

The measurement information may be obtained by the UE by measuring the signals of the first access network device and the at least one second access network device.

The UE may measure a signal sent by an access network device, and the measurement information may include a signal received power. The signal sent by the access network device may be a downlink positioning reference signal. The measurement information may include received powers in directions of the plurality of beams of the access network device, for example, may include RSRP information of the access network device. The RSRP information may include RSRPs of the plurality of beams of the access network device and/or information determined based on the RSRPs in directions of the plurality of beams of the access network device. The information determined based on the RSRPs in the directions of the plurality of beams of the access network device may include information obtained after an operation or processing is performed on the RSRPs of the plurality of beams of the access network device.

Before step S705, the UE may have completed measurement and store the measurement information. Alternatively, after receiving positioning request information, the UE measures the signals of the first access network device and the at least one second access network device, to obtain the measurement information. Optionally, the LMF apparatus may send a positioning measurement information measurement request to the UE. The positioning measurement information measurement request is used to indicate the UE to perform measurement. The LMF apparatus may send the positioning measurement information measurement request to the UE before step S705. The LMF apparatus may alternatively send the positioning measurement information indication information and the positioning measurement information measurement request to the UE at the same time. The positioning measurement information indication information and the positioning measurement information measurement request may be carried in a same message or different messages.

In step S706, the UE sends the measurement information to the first access network device.

The UE may send the measurement information to the first access network device through RRC signaling.

Optionally, the UE may send an identifier corresponding to the measurement information to the first access network device. The identifier may include an identifier of an access network device and/or an identifier of a cell. The cell is a cell covered by the access network device, for example, may be a cell in which the UE is located and that is in one or more cells covered by the access network device. The identifier and the measurement information may be carried in a same message, or may be carried in different messages. The first access network device may determine a correspondence between the measurement information and the access network device through the identifier sent by the UE. The first access network device may determine that the first measurement information in the measurement information is obtained by the UE by measuring the signal of the first access network device. The first access network device may determine that the $i^{th}$ piece of second measurement information in the measurement information is obtained by the UE by measuring the signal of the $i^{th}$ second access network device.

After the UE completes downlink measurement on a plurality of access network devices to obtain the measurement information, according to step S706, the UE reports the measurement information to the first access network device, where reported information may include the measurement information. Further, the reported information may further include the identifier of the access network device and/or the identifier of the cell that correspond/corresponds to the measurement information. In other words, the reported information may include the identifier of the first access network device and the identifier of the first cell. The reported information may further include the identifier of the at least one second access network device and/or the identifier of the at least one second cell.

In step S707, the first access network device sends intermediate information or the position information of the UE to the core network apparatus.

The intermediate information may be determined by the first access network device based on the measurement information, the first assistance information of the first access network device, and the second assistance information of each of the at least one second access network device. The first assistance information may include at least one of the following information: configuration information of a plurality of beams of the first access network device, beam gains of the plurality of beams of the first access network device, a feature of a channel between the first access network device and the UE, a fingerprint information base of the first access network device, a transmit power for sending the signal by the first access network device, or the transmit power of a signal of the first access network device. The second assistance information may include at least one of the following information: the configuration information of the plurality of beams of the second access network device, the beam gains of the plurality of beams of the second access network device, the feature of the channel between the second access network device and the UE, the fingerprint information base of the second access network device, the transmit power for sending the signal by the second access network device, or the transmit power of a signal of the second access network device. The intermediate information may include an AoD and/or a distance of the UE relative to the first access network device, and an AoD and/or a distance of the UE relative to each of the at least one second access network device.

In a possible implementation, the core network apparatus may be an LMF apparatus. An example in which the core network apparatus is the LMF apparatus is used for description in FIG. 7.

The first access network device may send the intermediate information or the position information of the UE to the LMF apparatus through an NRPPa.

After receiving the measurement information reported by the UE, the first access network device may determine the intermediate information based on the measurement information and assistance information sent by a neighboring cell access network device. The intermediate information includes the AoD and/or the distance from the first access network device to the UE, and the AoD and/or the distance from the at least one second access network device to the UE. After determining the intermediate information, the first access network device may report the intermediate information to the LMF apparatus, so that the LMF apparatus determines the position information of the UE based on the intermediate information sent by the first access network device. Alternatively, the first access network device may determine the position information of the UE based on the intermediate information, and send the position information of the UE to the LMF apparatus.

In another possible implementation, the core network apparatus may be an AMF apparatus.

After receiving the measurement information reported by the UE, the first access network device may determine the intermediate information based on the measurement information and assistance information sent by a neighboring cell access network device. The intermediate information includes the AoD and/or the distance from the first access network device to the UE, and the AoD and/or the distance from the at least one second access network device to the UE. The first access network device may determine the position information of the UE based on the intermediate information, and send the position information of the UE to the AMF apparatus.

Figure 8:
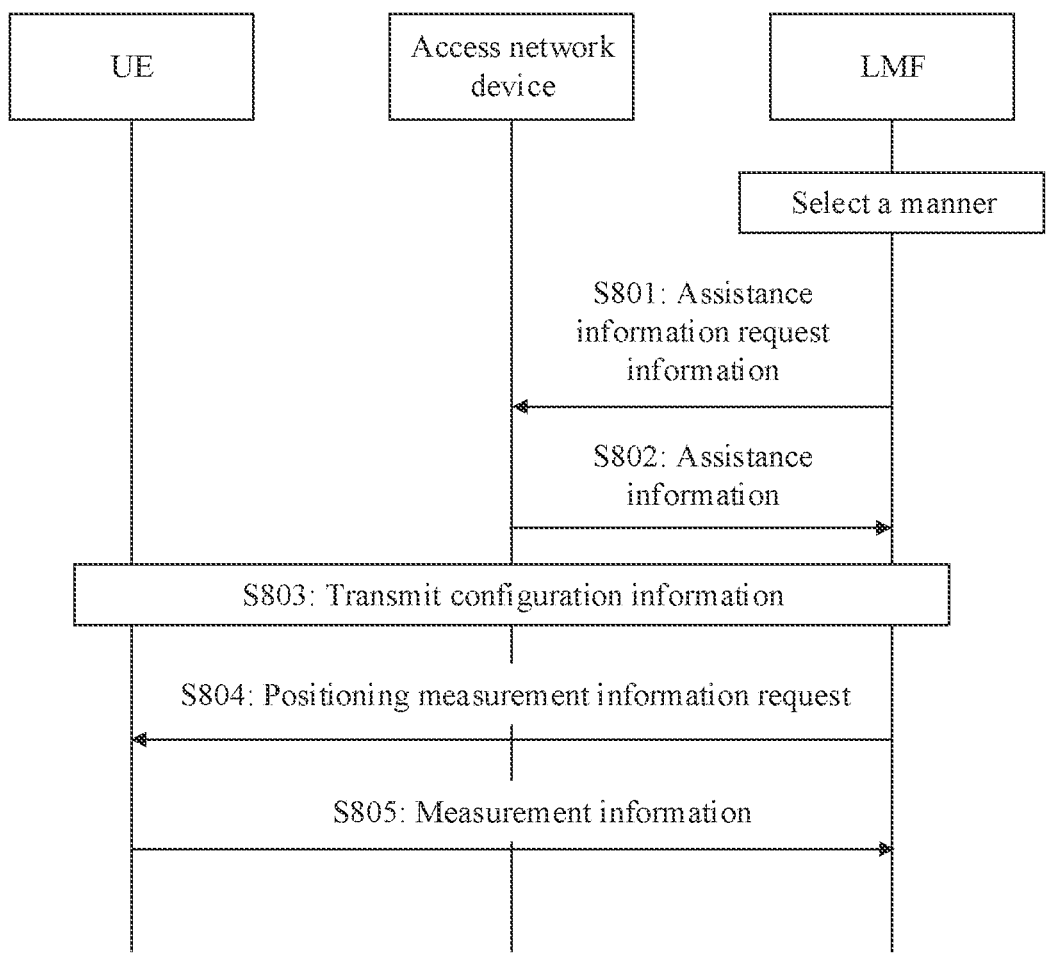
FIG. 8 is a schematic flowchart of a user equipment positioning method according to still another embodiment of this application.

FIG. 8 shows still another user equipment UE positioning method according to an embodiment of this application. In the method, an LMF apparatus receives assistance information of a plurality of access network devices. The LMF apparatus receives measurement information sent by user equipment UE, where the measurement information is obtained by the UE by measuring signals sent by the plurality of access network devices. The LMF apparatus determines intermediate information based on the assistance information and the measurement information. The LMF apparatus determines position information of the UE based on the intermediate information. The method includes steps S801 to S806.

In step S801, the LMF apparatus sends a first request message to the plurality of access network devices.

The first request message may include assistance information request information, and the assistance information request information is used to request assistance information of an access network device.

The assistance information may include at least one of the following information: configuration information of a plurality of beams of the access network device, beam gains of the plurality of beams of the access network device, a feature of a channel between the access network device and the UE, a fingerprint information base of the access network device, a transmit power for sending the signal by the access network device, or the transmit power of a signal of the access network device.

Optionally, the LMF apparatus may send configuration information request information to the plurality of access network devices, where the configuration information request information is used to request configuration information of an access network device. The configuration information may include a configuration of the signal of the access network device. The signal of the access network device may be used by the UE to perform downlink positioning measurement. Assistance information and configuration information of a same access network device may be carried in a same message or different messages. The first request message may further include the configuration information request information. The LMF apparatus may send the first request message to the plurality of access network devices near the UE, and request configuration information of the signals of the plurality of access network devices and the assistance information of the plurality of access network devices at the same time.

Before step S801, the LMF apparatus may select a positioning manner. The LMF apparatus may request, based on the selected positioning manner, configuration information of signals that are used for the positioning manner and that are of the plurality of access network devices.

In step S802, the LMF apparatus receives the assistance information sent by the plurality of access network devices.

Each of the plurality of access network devices may send a first reply message to the LMF apparatus, where the first reply message may include assistance information of the access network device.

Each of the plurality of access network devices may send configuration information of the access network device to the LMF apparatus. The configuration information and the assistance information may be carried in a same message or different messages. The first reply message may include the assistance information of the access network device and the configuration information of the access network device. In other words, when reporting configuration information of a signal of the access network device to the LMF apparatus, the access network device may add the assistance information used to determine intermediate information.

The configuration information of the signals of the plurality of access network devices may alternatively be sent to the LMF by one or more of the plurality of access network devices.

In step S803, the LMF apparatus sends configuration information of the plurality of access network devices to the UE.

Step S803 may be performed after the LMF apparatus receives the configuration information of the plurality of access network devices. For example, the first reply message includes the assistance information and the configuration information of the access network device, and step S803 may be performed after step S802.

In step S804, the LMF apparatus sends a second request message to the UE.

The second request message may be used to request the measurement information. The second request message may include a positioning measurement information request, and the positioning measurement information request may be used to request the measurement information of the UE. The positioning measurement information request may also be referred to as positioning measurement information indication information.

After receiving the positioning measurement information request, the UE may measure the signals of the plurality of access network devices to obtain the measurement information, and send the measurement information to the LMF apparatus. Alternatively, the UE may measure the signals of the access network devices before receiving the positioning measurement information request, and send the measurement information to the LMF apparatus after receiving the positioning measurement information request.

The measurement information may include a received power of each of the plurality of beams of the access network device, for example, may include RSRP information of the access network device. The RSRP information may include RSRPs of the plurality of beams of the access network device and/or information determined based on the RSRPs in directions of the plurality of beams of the access network device. The information determined based on the RSRPs in the directions of the plurality of beams of the access network device may include information obtained after an operation or processing is performed on the RSRPs of the plurality of beams of the access network device.

In step S805, the LMF apparatus receives the measurement information sent by the UE. The measurement information may be response information to the positioning measurement information request.

Optionally, the LMF apparatus may receive identifiers of the plurality of access network devices and/or identifiers of a plurality of cells that are/is sent by the UE, where an $i^{th}$ cell in the plurality of cells is a cell in which the UE is located in cells covered by an $i^{th}$ access network device in the plurality of access network devices, where i is a positive integer greater than or equal to 1. The identifiers of the plurality of access network devices and/or the identifiers of the plurality of cells, and the measurement information may be carried in a same message or different messages.

After the UE measures the signals of the plurality of access network devices to obtain the measurement information, the UE reports the measurement information to the LMF apparatus. The reported information may further include the identifiers of the plurality of access network devices or the identifiers of the plurality of cells. The LMF apparatus may determine the correspondence between the measurement information and the access network devices through the identifiers sent by the UE. The LMF apparatus may determine that an $i^{th}$ piece of measurement information in the measurement information is obtained by the UE by measuring a signal of the $i^{th}$ access network device in the plurality of access network devices.

After step S805, that is, after the LMF apparatus receives the information reported by the UE, the LMF apparatus determines the position information of the UE based on the measurement information and the assistance information of the plurality of access network devices. The position information of the UE is used to indicate a position of the UE. The LMF may determine the intermediate information based on the measurement information and the assistance information of the plurality of access network devices. The LMF apparatus may determine the position of the UE based on the intermediate information.

The intermediate information may include an AoD and/or a distance from each of the plurality of access network devices to the UE.

In the user equipment UE positioning method shown in FIG. 8, a request for assistance information may be added to a request message sent by the LMF apparatus to an access network device, and the assistance information may be added to a response message sent by the access network devices to the LMF apparatus, so that positioning of the UE is implemented.

The foregoing describes the method embodiments of the embodiments of this application with reference to FIG. 1 to FIG. 8. The following describes apparatus embodiments of the embodiments of this application with reference to FIG. 9 to FIG. 11. It should be understood that the descriptions of the method embodiments correspond to descriptions of the apparatus embodiments. Therefore, for parts that are not described in detail, refer to the descriptions in the foregoing method embodiments.

Figure 9:
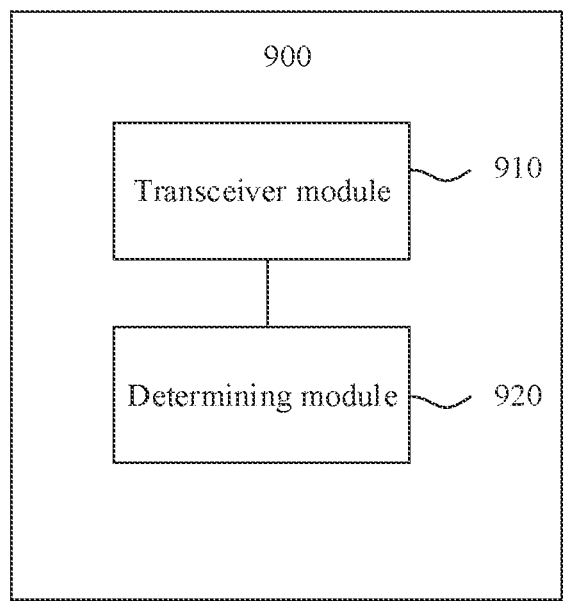
FIG. 9 is a schematic structural diagram of an access network device according to an embodiment of this application.

FIG. 9 shows an access network device 900 according to an embodiment of this application. The access network device 900 includes a transceiver module 910 and a determining module 920.

The transceiver module 910 is configured to receive first measurement information, where the first measurement information is obtained by user equipment UE by measuring a signal sent by the access network device 900. The determining module 920 is configured to determine first intermediate information based on the first measurement information and first assistance information that is of the access network device 900, where the first intermediate information is used to determine position information of the UE. The transceiver module 910 is further configured to send the first intermediate information to a first network device.

Optionally, the access network device 900 is a serving access network device of the UE, and the transceiver module 910 may be configured to receive the first measurement information sent by the UE or a core network apparatus.

Optionally, the transceiver module 910 may be further configured to receive at least one piece of second measurement information, where an $i^{th}$ piece of second measurement information in the at least one piece of second measurement information is obtained by the UE by measuring a signal sent by an $i^{th}$ second access network device, and i is a positive integer greater than or equal to 1. The transceiver module 910 may be further configured to send the $i^{th}$ piece of second measurement information to the $i^{th}$ second access network device. The first measurement information and the at least one piece of second measurement information are carried in a same message or different messages.

Optionally, the access network device 900 is an access network device other than the serving access network device of the UE, and the transceiver module 910 may be configured to receive the first measurement information sent by the serving access network device of the UE or the core network apparatus.

Optionally, the first network device has a location management function LMF.

Optionally, the first intermediate information includes an angle of departure AoD and/or a distance from the access network device to the UE.

Optionally, the first measurement information includes at least one piece of the following information: reference signal received power RSRP information corresponding to the access network device 900, received signal strength indicator RSSI information corresponding to the access network device 900, received signal strength RSS information corresponding to the access network device 900, or reference signal received quality RSRQ information corresponding to the access network device 900. The RSRP information may include RSRPs of a plurality of beams of the access network device 900 and/or information determined based on RSRPs in directions of the plurality of beams of the access network device 900. The information determined based on the RSRPs in the directions of the plurality of beams of the access network device 900 may include information obtained after an operation or processing is performed on the RSRPs of the plurality of beams of a first access network device.

Optionally, the first assistance information includes at least one of the following information: configuration information of the plurality of beams of the access network device 900, beam gains of the plurality of beams of the access network device 900, a feature of a channel between the access network device 900 and the UE, a fingerprint information base of the access network device 900, or a transmit power for sending the signal by the access network device 900, where the fingerprint information base includes a mapping relationship between at least one group of measurement information and the angle of departure AoD from the access network device 900 to the UE.

Figure 10:
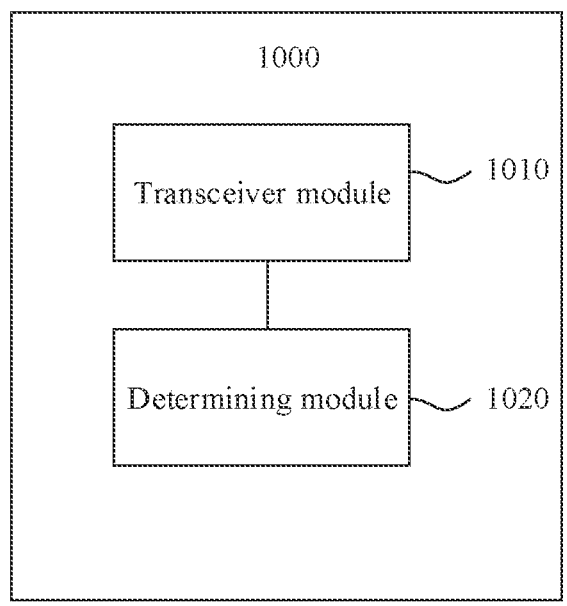
FIG. 10 is a schematic structural diagram of an access network device according to another embodiment of this application.

FIG. 10 shows a network device 1000 according to an embodiment of this application. The network device 1000 includes a transceiver module 1010 and a determining module 1020.

The transceiver module 1010 is configured to receive first assistance information of at least one first access network device, where the transceiver module 1010 is further configured to receive first measurement information sent by user equipment UE, and the first measurement information is obtained by the UE by measuring a signal sent by the at least one first access network device. The determining module 1020 is configured to determine first intermediate information based on the first assistance information and the first measurement information.

Optionally, the determining module 1020 may be further configured to determine position information of the UE based on the first intermediate information.

Optionally, the network device is a second access network device. The transceiver module 1010 may be further configured to receive second measurement information, where the second measurement information is obtained by the UE by measuring a signal sent by the network device 1000. The determining module 1020 may be further configured to determine second intermediate information based on the second measurement information and second assistance information of the network device 1000. The first measurement information and the second measurement information are carried in same or different information.

Optionally, the first assistance information is sent by each of the at least one first access network device to the network device 1000 after each of the at least one first access network device receives an identifier of the network device 1000 and/or an identifier of a first cell that are/is sent by an LMF apparatus, where the first cell is a cell in which the UE is located and that is in one or more cells covered by the network device 1000.

Optionally, the transceiver module 1010 may be further configured to send the first intermediate information and the second intermediate information to a second network device, where the second network device has an LMF function.

Optionally, the determining module 1020 may be further configured to determine the position information of the UE based on the at least one piece of first intermediate information and the second intermediate information.

Optionally, the transceiver module 1010 is configured to send the position information to an access and mobility management function AMF apparatus or the location management function LMF apparatus.

Optionally, the network device 1000 is the location management function LMF apparatus.

Optionally, the transceiver module 1010 may be further configured to: before the network device 1000 receives the first assistance information of the at least one first access network device, send assistance information request information to an $i^{th}$ first access network device in the at least one first access network device, where the assistance information request information is used to request first assistance information of the $i^{th}$ first access network device, and i is a positive integer greater than or equal to 1.

Optionally, the first intermediate information includes an angle of departure AoD and/or a distance from the first access network device to the UE.

Optionally, measurement information includes at least one of the following information: reference signal received power RSRP information, received signal strength indicator RSSI information, received signal strength RSS information, or reference signal received quality RSRQ information, where the RSRP information includes RSRPs in directions of a plurality of beams of each of the at least one access network device and/or information determined based on the RSRPs.

Optionally, the first assistance information includes at least one of the following information: configuration information of the plurality of beams of the first access network device, beam gains of the plurality of beams of the first access network device, a feature of a channel between the first access network device and the UE, a fingerprint information base of the first access network device, or a transmit power for sending the signal by the first access network device, where the fingerprint information base includes a mapping relationship between at least one group of measurement information and the AoD.

Figure 11:
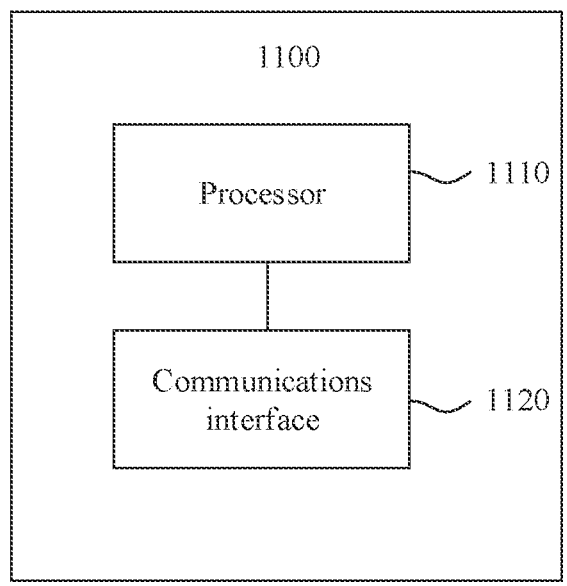
FIG. 11 is a schematic structural diagram of a communications apparatus according to an embodiment of this application.

FIG. 11 is a schematic structural diagram of a communications apparatus according to an embodiment of this application. The communications apparatus 1100 shown in FIG. 11 may correspond to the user equipment or the network device described above. The communications apparatus 1100 may include at least one processor 1110 and a communications interface 1120. The communications interface 1120 may be used by the communications apparatus 1100 to exchange information with another communications apparatus. When program instructions are executed by the at least one processor 1110, the communications apparatus 1100 is enabled to implement the steps, methods, operations, or functions performed by the access network device in the foregoing descriptions.

Figure 12:
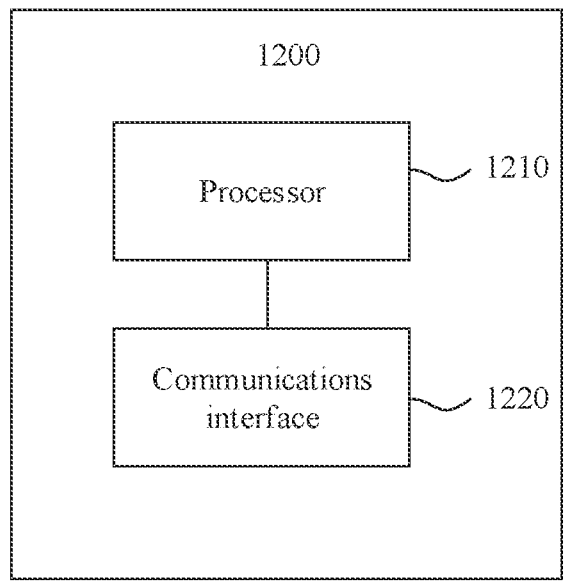
FIG. 12 is a schematic structural diagram of a communications apparatus according to another embodiment of this application.

FIG. 12 is a schematic structural diagram of a communications apparatus according to an embodiment of this application. A communications apparatus 1200 shown in FIG. 12 may correspond to the user equipment or the network device described above. The communications apparatus 1200 may include at least one processor 1210 and a communications interface 1220. The communications interface 1220 may be used by the communications apparatus 1200 to exchange information with another communications apparatus. When program instructions are executed by the at least one processor 1210, the communications apparatus 1200 is enabled to implement the steps, methods, operations, or functions performed by the network device in the foregoing descriptions.

An embodiment of this application further provides a computer program storage medium, where the computer program storage medium includes program instructions. When the program instructions are directly or indirectly executed, a function of the first access network device in the method in the foregoing descriptions is implemented.

An embodiment of this application further provides a computer program storage medium, where the computer program storage medium includes program instructions. When the program instructions are directly or indirectly executed, a function of the first network device in the method in the foregoing descriptions is implemented.

An embodiment of this application further provides a chip system, where the chip system includes at least one processor. When program instructions are executed in the at least one processor, a function of the first access network device in the method in the foregoing descriptions is implemented.

An embodiment of this application further provides a chip system, where the chip system includes at least one processor. When program instructions are executed in the at least one processor, a function of the first network device in the method in the foregoing descriptions is implemented.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In the embodiments of this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists. A and B may be singular or plural. The character "/" usually indicates an "or" relationship between the associated objects. The term "at least one item of the following" or a similar expression thereof means any combination of the items, including any combination of singular items or plural items. For example, at least one of a, b, and c may indicate a, b, c, a and b, a and c, b and c, or a, b, and c, where a, b, and c may be singular or plural. It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatuses, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, for example, a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A terminal device positioning method, comprising:
receiving, by a first network device, first assistance information of at least one first access network device;
receiving, by the first network device, first measurement information sent from a terminal device, wherein the first measurement information is obtained by the terminal device by measuring a signal sent from the at least one first access network device, wherein the first measurement information comprises reference signal received power (RSRP) information, and wherein the RSRP information comprises at least one of RSRPs in directions of a plurality of beams of the at least one first access network device or information determined based on the RSRPs; and determining, by the first network device, position information of the terminal device based on the first assistance information and the first measurement information, wherein the first assistance information comprises the directions of the plurality of beams of the at least one first access network device.

2. The method according to claim 1, further comprising: sending, by the first network device, the position information of the terminal device to an access and mobility management function (AMF) apparatus or a location management function (LMF) apparatus.

3. The method according to claim 1, wherein the first assistance information is sent by each first access network device of the at least one first access network device to the first network device after each first access network device of the at least one first access network device receives at least one of an identifier of the first network device or an identifier of a first cell sent by a location management function (LMF) apparatus, and wherein the first cell is a cell in which the terminal device is located and that is in one or more cells covered by the first network device.

4. The method according to claim 1, wherein the first network device is a location management function (LMF) apparatus.

5. The method according to claim 1, wherein before the receiving, by a first network device, first assistance information of at least one first access network device, the method further comprises:

sending, by the first network device, assistance information request information to an $i^{th}$ first access network device in the at least one first access network device, wherein the assistance information request information is used to request first assistance information of the $i^{th}$ first access network device, and wherein i is a positive integer greater than or equal to 1.

6. The method according to claim 1, wherein the first measurement information further comprises at least one of received signal strength indicator (RSSI) information, received signal strength (RSS) information, or reference signal received quality (RSRQ) information.

7. The method according to claim 1, further comprising: sending, by the at least one first access network device, the first assistance information to the first network device.

8. The method according to claim 1, further comprising: sending, by the at least one first access network device, the signal to the terminal device.

9. A communications apparatus, wherein the communications apparatus comprises at least one processor and one or more memories, and wherein the one or more memories are coupled to the at least one processor and store programming instructions for execution by the at least one processor to perform operations comprising:

receiving first assistance information of at least one first access network device;

receiving first measurement information sent from a terminal device, wherein the first measurement information is obtained by the terminal device by measuring a signal sent from the at least one first access network device, wherein the first measurement information comprises reference signal received power (RSRP) information, and wherein the RSRP information comprises at least one of RSRPs in directions of a plurality of beams of the at least one first access network device or information determined based on the RSRPs; and determining position information of the terminal device based on the first assistance information and the first measurement information, wherein the first assistance information comprises the directions of the plurality of beams of the at least one first access network device.

10. The communications apparatus according to claim 9, the operations further comprising:

sending the position information of the terminal device to an access and mobility management function (AMF) apparatus or a location management function (LMF) apparatus.

11. The communications apparatus according to claim 9, wherein the first assistance information is sent by each first access network device of the at least one first access network device to the communications apparatus after each first access network device of the at least one first access network device receives at least one of an identifier of the communications apparatus or an identifier of a first cell sent by a location management function (LMF) apparatus, and wherein the first cell is a cell in which the terminal device is located and that is in one or more cells covered by the communications apparatus.

12. The communications apparatus according to claim 9, wherein the communications apparatus is a location management function (LMF) apparatus.

13. The communications apparatus according to claim 9, wherein the operations further comprising:

before the receiving first assistance information of at least one first access network device, sending assistance information request information to an $i^{th}$ first access network device in the at least one first access network device, wherein the assistance information request information is used to request first assistance information of the $i^{th}$ first access network device, and wherein i is a positive integer greater than or equal to 1.

14. The communications apparatus according to claim 9, wherein the first measurement information further comprises at least one of received signal strength indicator (RSSI) information, received signal strength (RSS) information, or reference signal received quality (RSRQ) information.

15. The communications apparatus according to claim 9, wherein the communications apparatus is a network device or a chip.

16. A non-transitory computer-readable storage medium comprising instructions which, when executed by one or more processors of a communications apparatus, cause the one or more processors to perform operations comprising:

receiving first assistance information of at least one first access network device;

receiving first measurement information sent from a terminal device, wherein the first measurement information is obtained by the terminal device by measuring a signal sent from the at least one first access network device, wherein the first measurement information comprises reference signal received power (RSRP) information, and wherein the RSRP information comprises at least one of RSRPs in directions of a plurality of beams of the at least one first access network device or information determined based on the RSRPs; and determining position information of the terminal device based on the first assistance information and the first measurement information, wherein the first assistance information comprises the directions of the plurality of beams of the at least one first access network device.

17. The non-transitory computer-readable storage medium according to claim 16, the operations further comprising:
sending the position information of the terminal device to an access and mobility management function (AMF) apparatus or a location management function (LMF) apparatus.

18. The non-transitory computer-readable storage medium according to claim 16, wherein the first assistance information is sent by each first access network device of the at least one first access network device to the communications apparatus after each first access network device of the at least one first access network device receives at least one of an identifier of the communications apparatus or an identifier of a first cell sent by a location management function (LMF) apparatus, and wherein the first cell is a cell in which the terminal device is located and that is in one or more cells covered by the communications apparatus.

19. The non-transitory computer-readable storage medium according to claim 16, wherein the operations further comprising:
before the receiving first assistance information of at least one first access network device, sending assistance information request information to an $i^{th}$ first access network device in the at least one first access network device, wherein the assistance information request information is used to request first assistance information of the $i^{th}$ first access network device, and wherein i is a positive integer greater than or equal to 1.

20. The non-transitory computer-readable storage medium according to claim 16, wherein the first measurement information further comprises at least one of received signal strength indicator (RSSI) information, received signal strength (RSS) information, or reference signal received quality (RSRQ) information.

* * * * *

UNITED STATES PATENT AND TRADEMARK OFFICE
CERTIFICATE OF CORRECTION

| | |
|---|---|
| PATENT NO. | : 12,015,965 B2 |
| APPLICATION NO. | : 17/475618 |
| DATED | : June 18, 2024 |
| INVENTOR(S) | : Jinping Hao et al. |

It is certified that error appears in the above-identified patent and that said Letters Patent is hereby corrected as shown below:

On the Title Page

In Column 2 (item (56) Other Publications), In Line 1, Delete "1 Extended" and insert -- Extended --.

Signed and Sealed this
Fifth Day of November, 2024

Katherine Kelly Vidal
*Director of the United States Patent and Trademark Office*